United States Patent
Auray et al.

(10) Patent No.: US 7,820,922 B2
(45) Date of Patent: *Oct. 26, 2010

(54) ELECTRICAL OFFSET NIPPLE CONNECTOR WITH FRUSTRO-CONICAL RETAINING RINGS

(75) Inventors: Delbert Auray, Southport, CT (US); Lawrence J. Smith, Stamford, CT (US)

(73) Assignee: Bridgeport Fittings, Inc., Stratford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/151,245

(22) Filed: May 5, 2008

(65) Prior Publication Data

US 2008/0277160 A1    Nov. 13, 2008

Related U.S. Application Data

(63) Continuation-in-part of application No. 12/006,946, filed on Jan. 8, 2008, which is a continuation-in-part of application No. 11/903,410, filed on Sep. 21, 2007, which is a continuation-in-part of application No. 11/501,131, filed on Aug. 8, 2006, now Pat. No. 7,488, 905, which is a continuation-in-part of application No. 11/403,099, filed on Apr. 12, 2006, now Pat. No. 7,151, 223, which is a continuation-in-part of application No. 11/400,606, filed on Apr. 7, 2006, now Pat. No. 7,154, 042, which is a continuation-in-part of application No. 11/364,435, filed on Feb. 28, 2006, now Pat. No. 7,205, 489, which is a continuation-in-part of application No. 11/258,990, filed on Oct. 26, 2005, now Pat. No. 7,057, 107, which is a continuation-in-part of application No. 11/151,374, filed on Jun. 13, 2005, now Pat. No. 7,075, 007, which is a continuation-in-part of application No. 11/100,250, filed on Apr. 6, 2005, now Pat. No. 7,064, 272, which is a continuation-in-part of application No. 10/939,619, filed on Sep. 13, 2004, now Pat. No. 6,916,988.

(51) Int. Cl.
H02G 3/18 (2006.01)

(52) U.S. Cl. .................. 174/650; 174/665; 174/659; 174/656; 174/666; 439/557

(58) Field of Classification Search ............ 174/666, 174/650, 659, 656, 665, 68.1, 68.3, 72 C, 174/69, 71 R, 86, 657, 661, 70 R; 439/92, 439/142, 320, 557, 567, 552, 587; 403/197
See application file for complete search history.

(56) References Cited

U.S. PATENT DOCUMENTS 1,483,218 A    2/1924    Fahnestock (Continued)

OTHER PUBLICATIONS

Arlington Industries, Inc., Catalog No. 491, Apr. 1991, 3 pages.
Bridgeport Fittings, Inc., Catalog No. MC0100 Rev. 2, Jun. 2004, 3 pages including p. 20.

*Primary Examiner*—Angel R Estrada
(74) *Attorney, Agent, or Firm*—Fattibene and Fattibene; Paul A. Fattibene

(57) ABSTRACT

This disclosure is directed to electrical connectors, and more specifically to various types of electrical connectors, including an offset nipple connector assembly having an integrally formed connector body having opposed end openings provided with an outer surface that slopes downwardly toward the outlet opening and having a complementary sloping or frustro-conical, snap fit, outer, retaining ring with locking tangs for snap locking the end portion of the connector body to an associated electric box or panel, and grounding tangs engaging the inner periphery of a knock out hole of an electric box or panel for effecting a positive electrical ground therebetween.

12 Claims, 19 Drawing Sheets

U.S. PATENT DOCUMENTS

| | | | | |
|---|---|---|---|---|
| 1,725,883 | A | 8/1929 | Recker | |
| 1,830,250 | A | 11/1931 | Tiefenbacher | |
| 2,156,003 | A | 4/1939 | Tinnerman | |
| 2,160,353 | A | 5/1939 | Conners | |
| 2,393,581 | A * | 1/1946 | Wentworth | 220/3.3 |
| 2,445,663 | A | 7/1948 | Peters | |
| 2,744,769 | A | 5/1956 | Roeder et al. | |
| 2,823,932 | A | 2/1958 | Schigut | |
| 3,000,424 | A | 9/1961 | Weise | |
| 3,183,297 | A | 5/1965 | Curtiss | |
| 3,436,105 | A | 4/1969 | Miklya | |
| 3,544,705 | A | 12/1970 | Winston | |
| 3,631,738 | A | 1/1972 | Harper | |
| 3,788,582 | A | 1/1974 | Swanquist | |
| 3,814,467 | A | 6/1974 | Van Buren, Jr. | |
| 3,858,151 | A | 12/1974 | Paskert | |
| 3,907,334 | A * | 9/1975 | Schera, Jr. | 174/86 |
| 3,993,333 | A | 11/1976 | Biswas | |
| 4,012,578 | A | 3/1977 | Moran et al. | |
| 4,021,604 | A | 5/1977 | Dola et al. | |
| 4,032,178 | A | 6/1977 | Neuroth | |
| 4,248,459 | A | 2/1981 | Pate et al. | |
| 4,361,302 | A | 11/1982 | Lass | |
| 4,468,535 | A | 8/1984 | Law | |
| 4,619,332 | A | 10/1986 | Sheehan | |
| 4,621,166 | A | 11/1986 | Neuroth | |
| 4,626,620 | A | 12/1986 | Plyler | |
| 4,657,212 | A | 4/1987 | Gilmore et al. | |
| 4,711,472 | A | 12/1987 | Schnell | |
| 4,773,280 | A | 9/1988 | Baumgarten | |
| 4,880,387 | A | 11/1989 | Stikeleather et al. | |
| 4,981,310 | A | 1/1991 | Belisaire | |
| 4,990,721 | A | 2/1991 | Sheehan | |
| 5,132,493 | A | 7/1992 | Sheehan | |
| 5,171,164 | A | 12/1992 | O'Neil et al. | |
| 5,189,258 | A | 2/1993 | Pratesi | |
| 5,248,850 | A * | 9/1993 | Laney | 174/665 |
| 5,266,050 | A | 11/1993 | O'Neil et al. | |
| 5,283,393 | A * | 2/1994 | Guginsky | 174/68.1 |
| 5,342,994 | A | 8/1994 | Pratesi | |
| 5,422,437 | A | 6/1995 | Schnell | |
| 6,034,326 | A | 3/2000 | Jorgensen | |
| 6,043,432 | A | 3/2000 | Gretz | |
| 6,080,933 | A | 6/2000 | Gretz | |
| 6,114,630 | A | 9/2000 | Gretz | |
| 6,114,631 | A * | 9/2000 | Gretz | 174/68.1 |
| 6,133,529 | A | 10/2000 | Gretz | |
| 6,194,661 | B1 | 2/2001 | Gretz | |
| 6,335,488 | B1 | 1/2002 | Gretz | |
| 6,335,884 | B1 | 3/2002 | Gretz | |
| 6,352,439 | B1 | 3/2002 | Stark et al. | |
| 6,380,483 | B1 | 4/2002 | Blake | |
| 6,444,907 | B1 | 9/2002 | Kiely | |
| 6,476,322 | B1 | 11/2002 | Dunne et al. | |
| 6,521,831 | B1 | 2/2003 | Gretz | |
| D473,783 | S | 4/2003 | Kiely | |
| 6,555,750 | B2 | 4/2003 | Kiely | |
| 6,604,400 | B1 | 8/2003 | Gretz | |
| D479,984 | S | 9/2003 | Kiely | |
| 6,670,553 | B1 | 12/2003 | Gretz | |
| 6,682,355 | B1 | 1/2004 | Gretz | |
| 6,737,584 | B2 | 5/2004 | Kiely | |
| 6,768,057 | B2 | 7/2004 | Blake | |
| 6,780,029 | B1 | 8/2004 | Gretz | |
| 6,849,803 | B1 | 2/2005 | Gretz | |
| 6,860,758 | B1 | 3/2005 | Kiely | |
| 6,872,886 | B2 | 3/2005 | Kiely | |
| 6,916,988 | B1 | 7/2005 | Auray et al. | |
| 6,957,968 | B1 * | 10/2005 | Gretz | 174/661 |
| 7,154,042 | B2 * | 12/2006 | Auray et al. | 174/68.3 |
| 7,214,890 | B2 * | 5/2007 | Kiely et al. | 174/666 |
| 7,238,894 | B1 * | 7/2007 | Gretz | 174/655 |
| 7,394,021 | B2 * | 7/2008 | Magno, Jr. | 174/68.1 |
| 7,432,452 | B2 * | 10/2008 | Gardner | 174/650 |

* cited by examiner

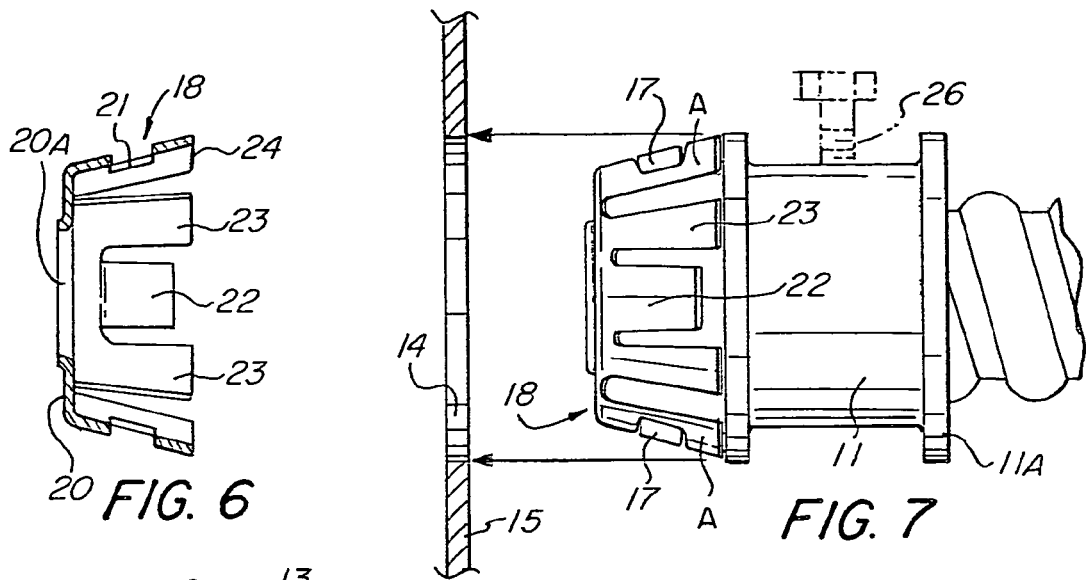
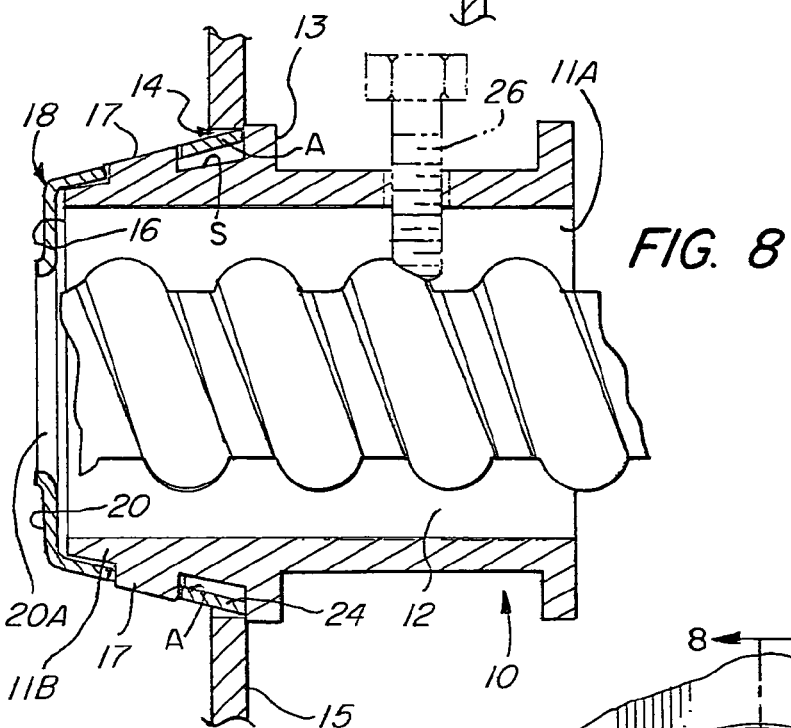
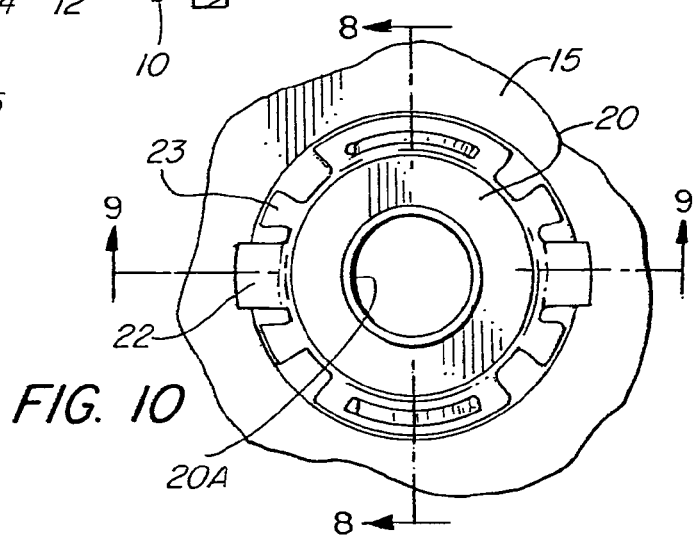

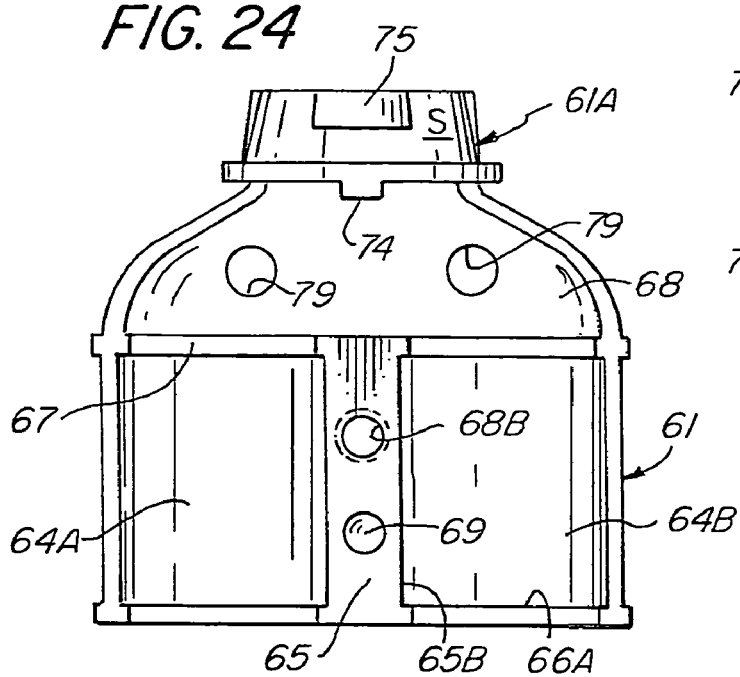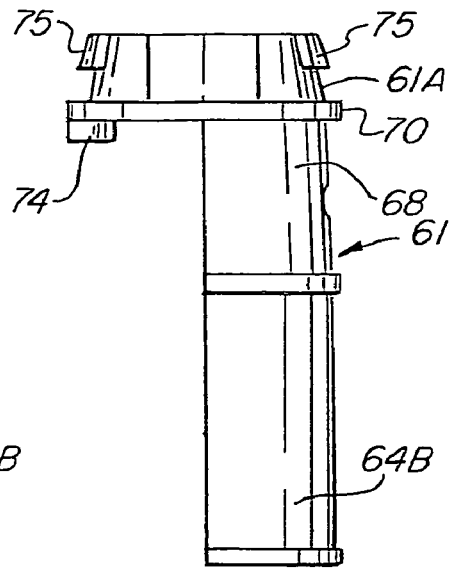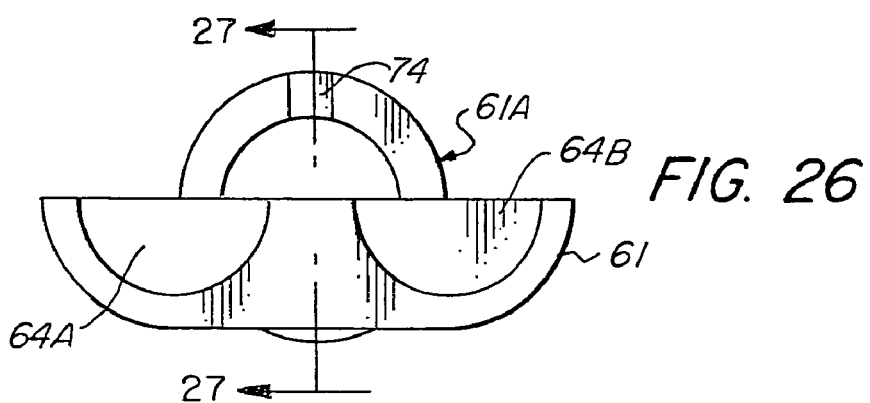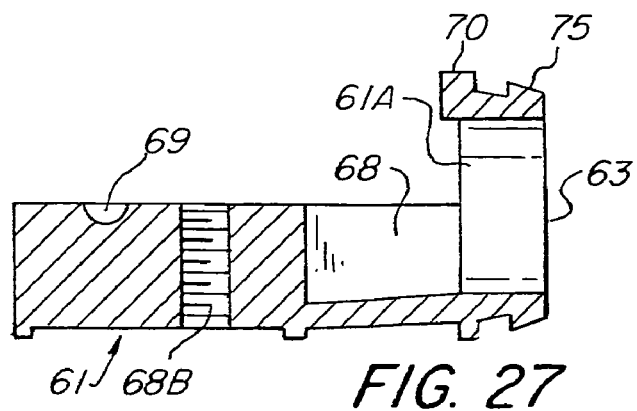

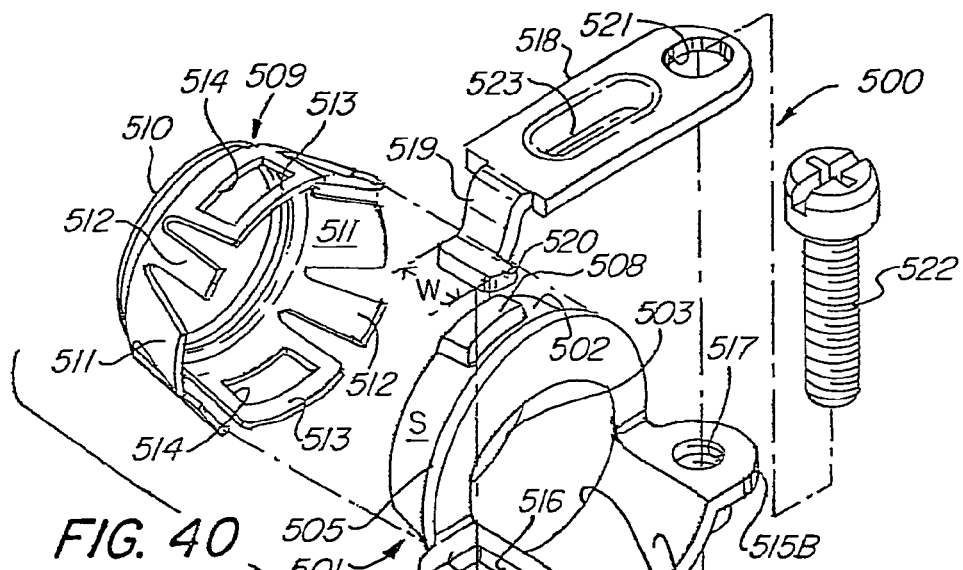
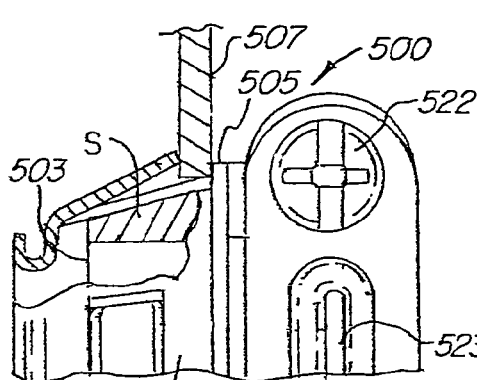
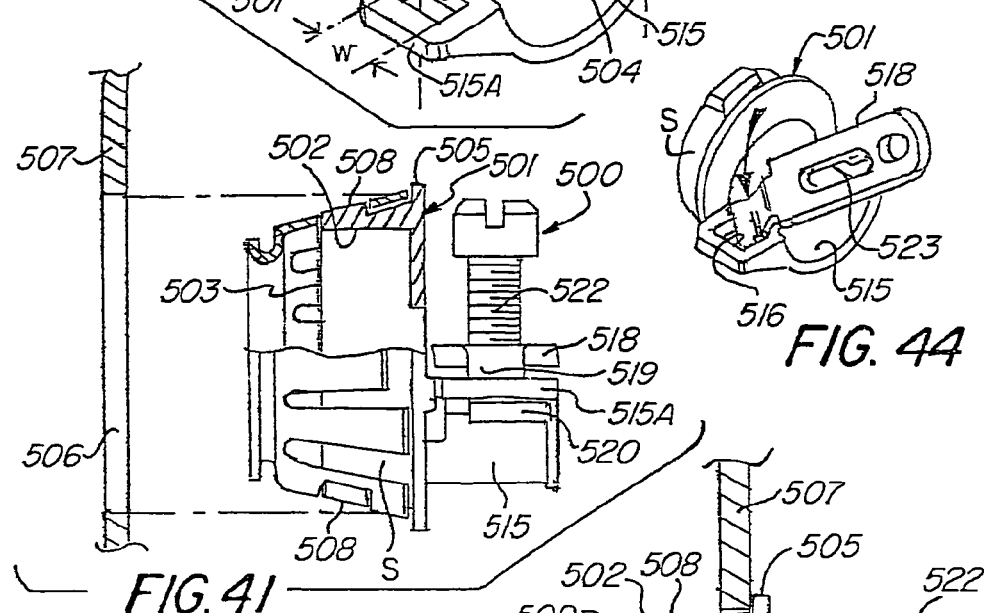
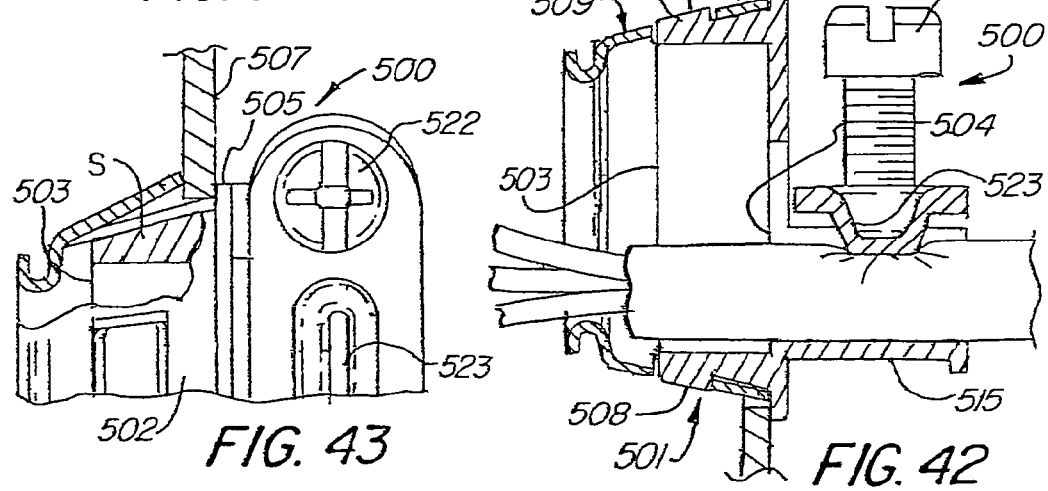

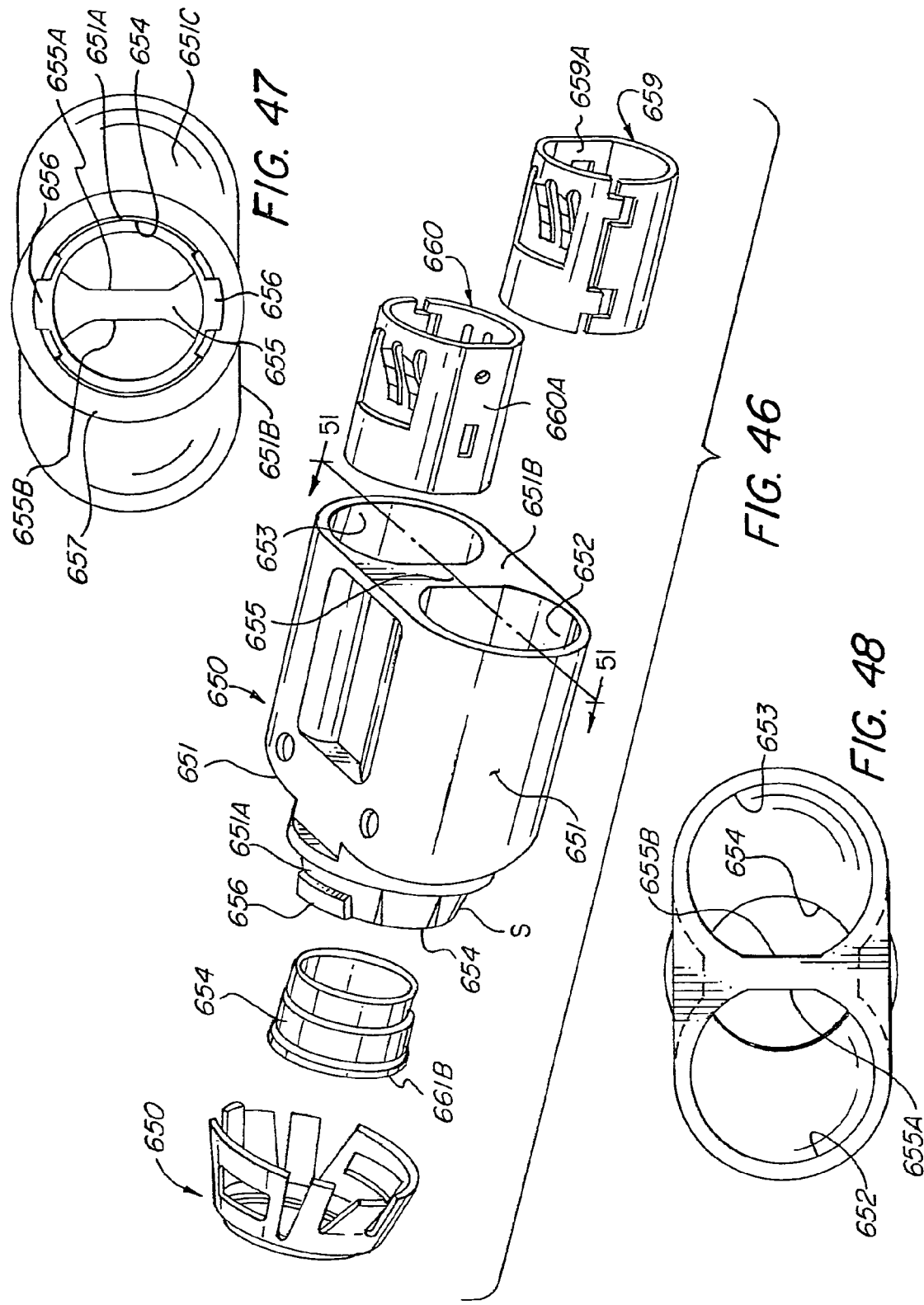

ELECTRICAL OFFSET NIPPLE CONNECTOR WITH FRUSTRO-CONICAL RETAINING RINGS

RELATED APPLICATIONS

This application is a continuation in part of application having Ser. No. 12/006,946 filed Jan. 8, 2008, which is a continuation in part application having Ser. No. 11/903,410 filed Sep. 21, 2007 which is a continuation in part application of application Ser. No. 11/501,131 filed Aug. 8, 2006 now U.S. Pat. No. 7,488,905 for Electrical Connector With Outer Retainer Ring and Internal Unidirectional Conductor Retainer, which is a continuation in part application of application Ser. No. 11/403,099 filed Apr. 12, 2006 for Snap Fit Electrical Connector Assembly With Frustro-Conical Retainer Ring And Internal Unidirectional Snap Fit Wire Conductor Retainer, now U.S. Pat. No. 7,151,223, which is a continuation in part application of application Ser. No. 11/400,606 filed Apr. 7, 2006 for Electrical Connector With Frustro Conical Snap Fit Retainer Ring Constructed To Enhance The Insertion Of The Connector Through A Knockout Hole Of An Electric Box, now U.S. Pat. No. 7,154,042, which is a continuation in part application of application Ser. No. 11/364,435 filed Feb. 28, 2006 for Snap-Fit Electrical Connector Assembly For Facilitating The Connection of the Electric Connector Assembly To An Electric Box, now U.S. Pat. No. 7,205,489, which is a continuation in part of application Ser. No. 11/258,990 filed Oct. 26, 2005, now U.S. Pat. No. 7,057,100, which is a continuation in part of application Ser. No. 11/151,374 filed Jun. 13, 2005 for Snap Fit Electrical Connector Assembly With Conical Outer Snap Fit Retainer And One Or More Internal Snap Fit Wire Retainers, now U.S. Pat. No. 7,075,007, which is a continuation in part of application Ser. No. 11/100,250 filed Apr. 6, 2005 for Snap In Electrical Connector Assembly With Unidirectional Wire Conductor Retainer Ring, now U.S. Pat. No. 7,064,272, which is a continuation in part application of application Ser. No. 10/939,619 filed Sep. 13, 2004 for Electrical Connector With Frustro Conical Snap Fit Retaining Ring, now U.S. Pat. No. 6,916,988 B1, each of which is incorporated herein by reference.

FIELD OF THE INVENTION

This invention is directed to a further advancement in the field of electrical connector assemblies having a snap fit retaining ring circumscribing the outlet end of a connector body for effecting a snap fit connection to an electrical box of the types described in U.S. Pat. No. 6,860,758, U.S. Pat. No. 6,935,891. More specifically, this application is directed to further improvements in electrical connector assemblies.

BACKGROUND OF THE INVENTION

Electrical connectors are commonly used for attaching electrical conductors, cables, wires, electrical metal tubing (EMT) or the like to an electric box, e.g. a junction box, outlet box, switch box, fuse box, or other similar type of electric box or panel. Such known electrical connectors are either of a type that are secured to an electric box by a threaded lock nut or by means of a conventional circular snap fit retaining ring of the type disclosed in U.S. Pat. Nos. 6,860,758; 6,444,907; 5,189,258; 5,266,050; 5,171,164; 2,744,769 and 1,483,218 for example. Reference is also made to U.S. Pat. No. 6,768,057 which is directed to a right angle type connector formed of a pair of sheet metal stampings fitted together and secured to an electrical box with a snap fit arrangement.

Also known are connectors formed as connector caps which are adapted to be fitted over the end of a conductor, cable or wires, such as disclosed in U.S. Pat. No. 4,880,387. Various other known efforts to facilitate the connection of an electrical conductor to an electric box are evidenced by U.S. Pat. Nos. 6,043,432; 6,080,933; 6,114,630; 6,133,529; 6,194,661; 6,335,488; 6,352,439; 6,355,884; 6,444,907; 6,555,750; 6,604,400; 6,670,553; 6,737,584; 6,682,355; 6,780,029 and 6,849,803.

More specifically this disclosure is also directed to electrical offset fittings that are typically used between adjacent electrical boxes or panels when the box knock out openings are not in alignment due to the uneven mounting of such boxes or panels, or due to the box or panel differences. For example, U.S. Pat. No. 3,000,424 discloses a thin wall, steel, offset fitting which is formed by bending an elongated steel tube or conduit having external threads at one end by which the offset fitting is attached to an electric box or panel by means of a lock nut.

Notwithstanding the extensive background relating to electrical connectors, continuing efforts are being made to improve, simplify and/or reduce the cost and/or complexity of the known connectors in an effort to advance the electrical connector art. This disclosure is directed to such efforts.

SUMMARY OF THE INVENTION

An object of this invention is to provide an electrical connector in the form of an offset nipple having an integral or unitary connector body provided with an outer frustro-conical retainer secured to at least one end of the connector body.

An object of this invention is to provide an offset nipple electrical connector provided with a frustro-conically shaped external retaining ring having a leading edge, a trailing edge and an intermediate portion therebetween having an integrally formed outwardly sprung locking tang that can be readily connected to a knock-hole of an electric box, panel or enclosure with a snap-fit wherein the trailing edge of the retaining ring functions as the electrical ground between the electrical box and the offset nipple fitting.

Another object of this invention is to provide for an electrical offset nipple assembly that includes an electrical offset connector body having opposed outlet openings having a frustro-conical outer surface for receiving thereon a complementary frustro-conical retaining ring that is readily fitted to and retained about the outlet end opening of the offset nipple.

Another object is to provide an offset nipple assembly comprising a connector body having an opposed end free of any circumscribing retaining flange and having an associated externally circumscribing snap fit retainer circumscribing the flangeless opposed free ends in a secured manner.

Another object is to provide a retaining ring, adapted to be fitted onto the outlet end of an integrally formed offset nipple connector body whereby the retainer ring is frustro-conical in shape having a first series of tangs for securing the connector body to an electrical box and a trailing edge or tang for affecting a positive electrical ground with an associated electrical box.

Another object is to provide an offset nipple connector assembly that is relatively simple to fabricate, positive in operation, and economical to produce and sell.

The foregoing objects and other features and advantages are attained by an electrical offset nipple connector assembly that includes an integrally formed offset connector body having opposed offset end portions defining end openings adapted to be secured between a pair of adjacent electric boxes or panels. A radially outwardly extending flange circumscribes the respective offset end portions which function as a stop to limit the insertion of the outlet end portion through the knockout hole of an associated electric box or panel. The opposed end portions of the offset connector body are each provided with an outer surface that converges or tapers inwardly toward the outlet opening thereof. Formed on the surface of the opposed end portions are one or more retaining lugs, which may be circumferentially spaced about the opposed end opening and a frustro-conically shaped, snap-fit retainer is fitted onto and secured to the respective end portions of the offset connector body.

The frustro-conical retainer is formed from a blank of sheet material, e.g. spring steel or the like, having a cruciform shape that includes a face portion or simply a central opening wherein the radiating arms of the cruciform blank are disposed about the face portion or central opening to define a frustro-conical shaped cup or ring. The retainer ring or cup so formed is provided with blanked out or die cut tangs to define outwardly bent locking tangs. The trailing edge of the frustro-conical ring or cup provides for electrical grounding in the assembled position of the electrical connector to an electric box or panel.

The frustro-conical ring so formed also has a slot adapted to receive a retaining lug when the retaining ring is fitted onto the opposed end of the offset nipple body whereby the free or trailing edge of the ring or cup define a grounding edge or tang that engages the inner periphery of the knockout hole of an associated electric box or panel for effecting positive electrical continuity or grounding therebetween.

To form the retaining ring, the cruciform arms are arranged to be folded relative to the central opening or face forming portion that circumscribes the central opening, to define a unitary frustro-conically shaped cup-like member or ring to compliment or be fitted onto the outlet end portion of the offset nipple body. The retaining ring thus formed is fitted over or onto the outlet end portion of the offset nipple body so that the retaining slot formed in the ring is adapted to receive the complementary retaining lug formed on the surface of the outlet end of the offset nipple for retaining or securing the frustro-conical ring on the opposed end portion.

With the construction described, the offset nipple assembly can be readily inserted through the knockout hole of an electric box wherein the locking tangs will initially be flexed inwardly to pass through the knock-out hole of an electric box, and then spring outwardly to lock the offset nipple assembly to an associated electric box or electric support panel with the trailing or grounding edge or tang of the retaining ring being inherently biased so as to be urged against the internal periphery of the knockout hole due to the frustro-conical configuration and inherent resiliency of the grounding edge or tang of the retaining ring to effect a positive electric ground as a result thereof.

IN THE DRAWINGS

FIG. 6 is a sectional view of the outer retainer ring taken along line 6-6 on FIG. 3.

FIG. 7 is a side view of the connector assembly illustrating the alignment thereof relative to the knockout opening of an electric box.

FIG. 8 is a section side view illustrating the connector assembly secured to an electric box, taken along line 8-8 on FIG. 10.

FIG. 10 is a fragmentary front view of the connector assembly secured to an electric box as viewed from the electrical box.

FIG. 24 is the interior plan view of one section of the connector housing of the embodiment illustrated in FIG. 20.

FIG. 25 is an outer end view of FIG. 24.

FIG. 26 is an end view of the connector housing section of FIG. 24.

FIG. 27 is a sectional view of the housing section taken along line 27-27 on FIG. 26.

FIG. 40 is an exploded perspective view of another embodiment of the invention.

FIG. 41 is a partially exploded side view of the embodiment of FIG. 40 having parts shown in section.

FIG. 42 is a side sectional view of the embodiment of FIG. 41 showing the connector assembly attached to a knockout hole of an electric box or panel.

FIG. 43 is a fragmentary side view similar to FIG. 42 rotated 90° to illustrate the locking position of the locking tangs relative to an electric box or panel.

FIG. 44 is a detail perspective view illustrating the assembly of hinging the clamping strap to the support saddle.

FIG. 46 is an exploded perspective view of a modified duplex connector embodying the invention.

FIG. 47 is the front or outlet end view of the duplex connector body of FIG. 46.

FIG. 48 is the rear or inlet end view of the duplex connector body of FIG. 46.

DETAILED DESCRIPTION

Figure 1:
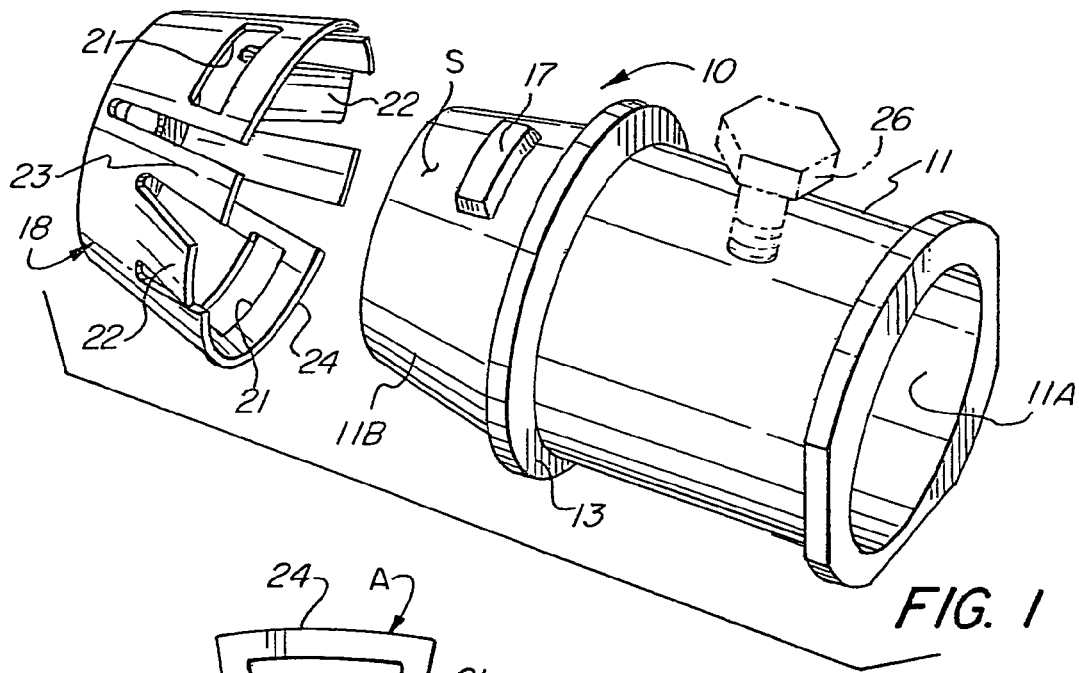
FIG. 1 is an exploded perspective view of the electrical connector assembly.

Referring to the drawings, there is shown in FIG. 1 an electrical connector assembly 10. The connector assembly 10 includes a connector body 11, which is usually formed as a metal casting, e.g. zinc or other suitable metallic alloy. The connector body 11 is formed with an inlet end portion 11A and an outlet end portion 11B and having a bore 12 extending therethrough. Intermediate the connector body 11 or between the inlet end portion 11A and outlet end portion 11B there is provided a radially outwardly extending flange 13 which functions as a stop to limit the amount that the connector body 11 may be inserted through the knockout hole 14 of an electric box or panel 15, as noted in FIG. 8.

As shown in FIGS. 1 and 8, the outer surface S of the outlet end portion 11B slopes, tapers or converges toward the outlet opening 16 whereby the outer surface S of the outlet end portion 11B has a generally frustro-conical configuration. Formed on the surface S of the outlet end portion 11B is an outwardly projecting retainer lug 17. In the illustrated embodiment, two such lugs 17 are shown disposed 180° apart about the outer circumference of the outlet end portion 11B.

Figure 2:
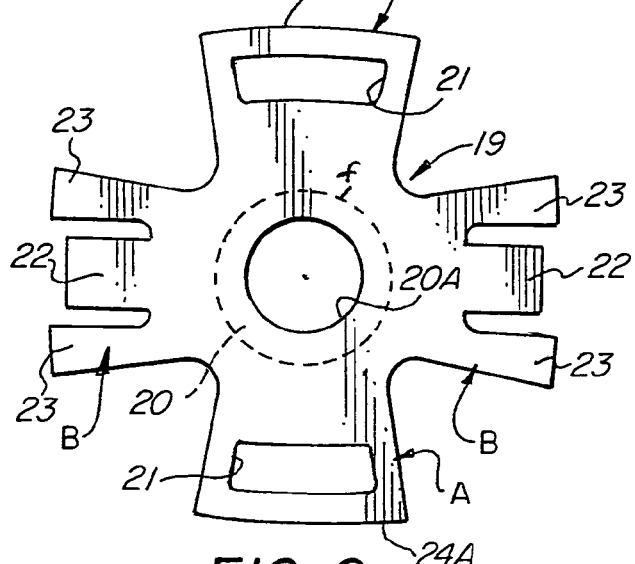
FIG. 2 is a plan view of the blank from which the outer retaining ring of the present invention is formed.
Figure 3:
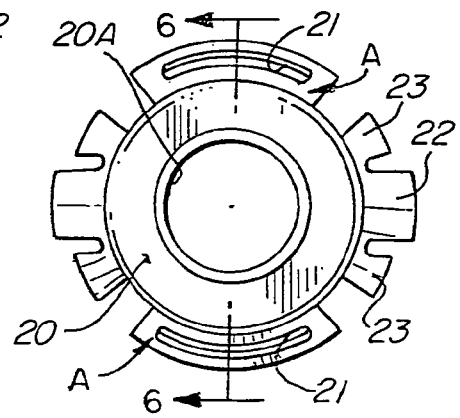
FIG. 3 is a detail front view of the outer retainer ring.
Figure 5:
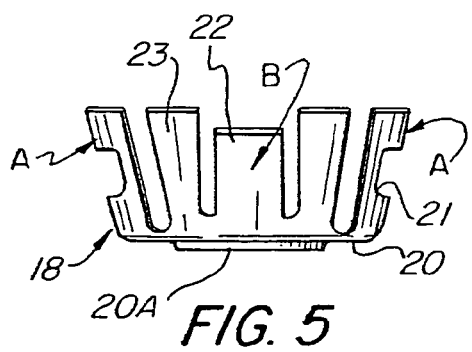
FIG. 5 is a detail view of FIG. 4 rotated 90°.
Figure 4:
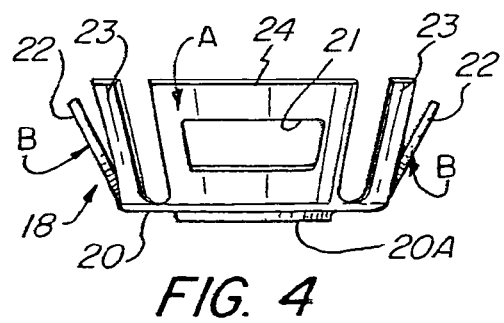
FIG. 4 is a detail top plan view of the outer retainer ring of FIG. 3.

The connector assembly 10 also includes a snap fit retaining ring 18. In accordance with this invention, the retaining ring 18 is integrally formed from a blank 19 of spring steel material. As best seen in FIG. 2, the blank 19 is initially formed or stamped to define a generally cruciform shape. The cruciform shape is provided with a face portion 20 having central opening or hole 20A and having four generally radially extending arms defining two pairs of oppositely disposed arms AA and BB.

Figure 9:
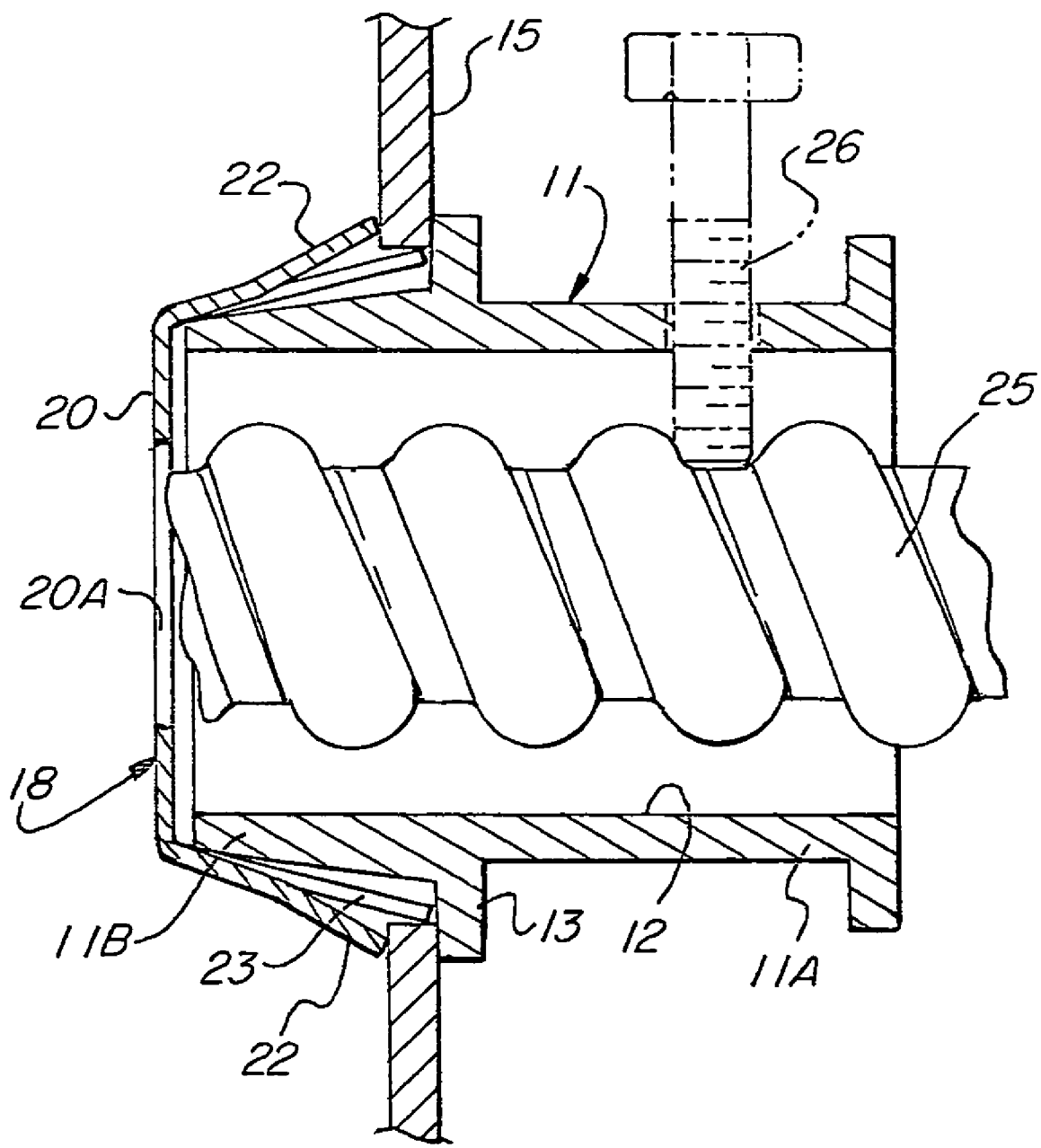
FIG. 9 is a sectional view taken along line 9-9 on FIG. 10 and rotated 90°.
Figure 11:
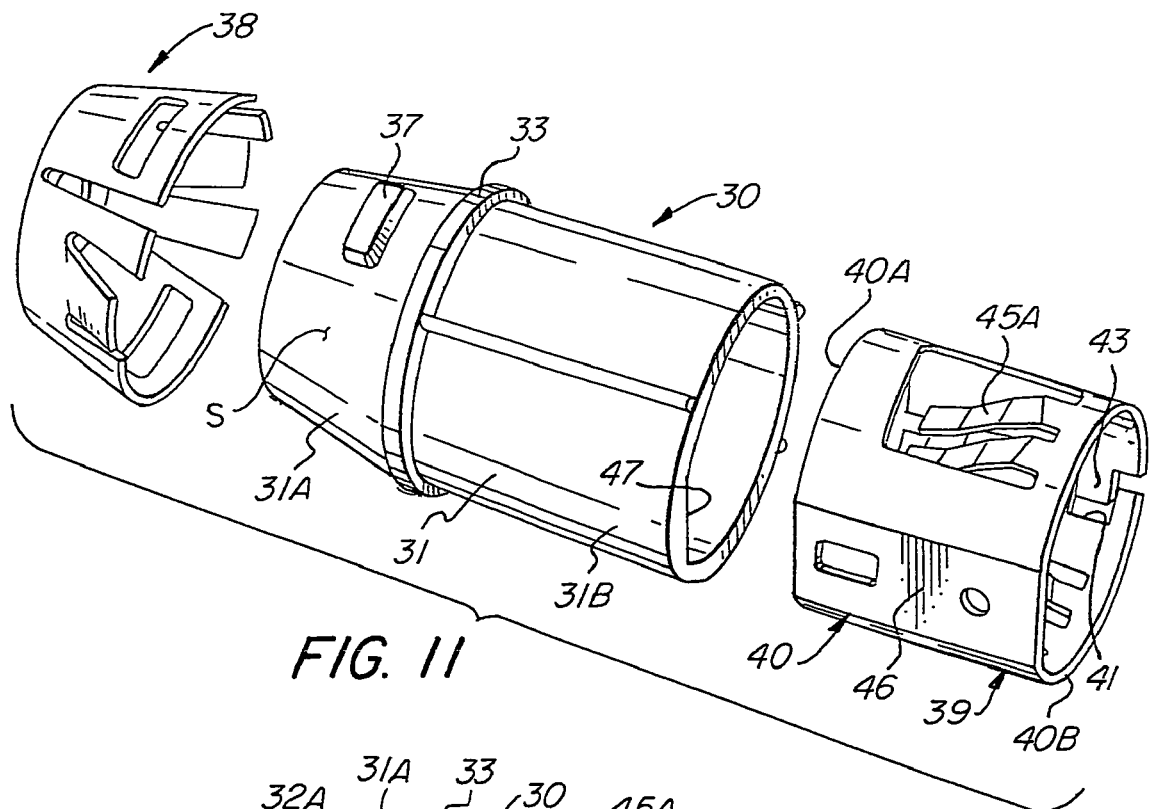
FIG. 11 is an exploded perspective view of a modified form of the invention.
Figure 12:
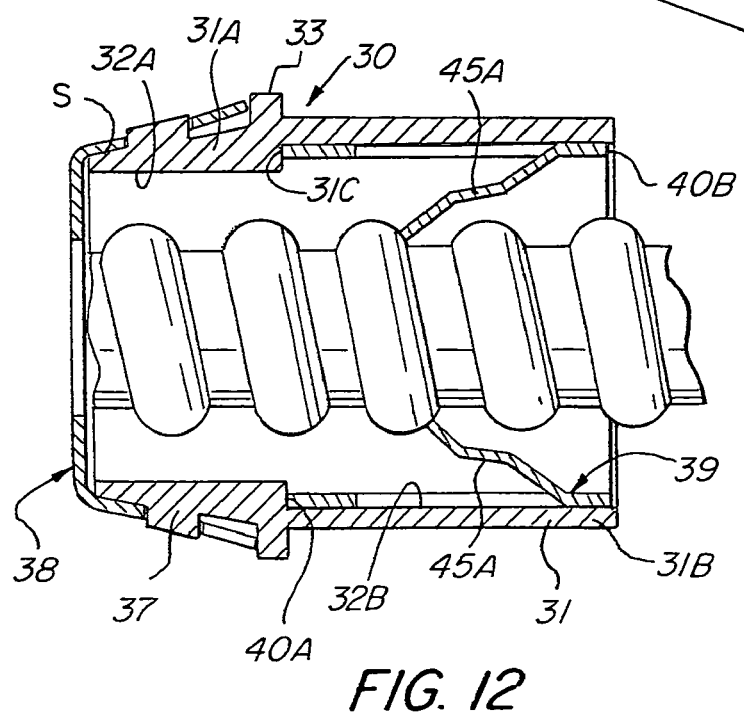
FIG. 12 is a sectional side view of the modified form of the invention of FIG. 11.
Figure 13:
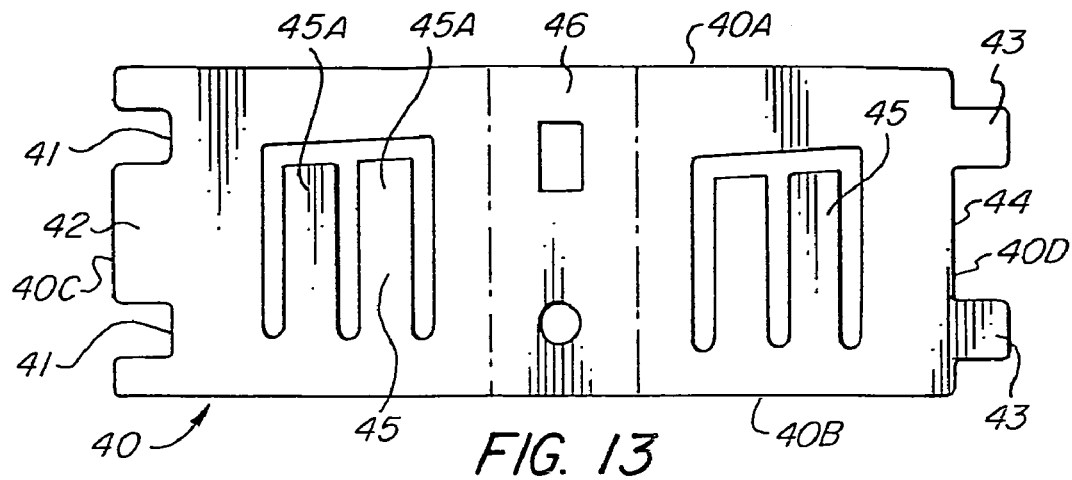
FIG. 13 is a top plan view of the blank from which the internal wire conductor retainer is formed.
Figure 14:
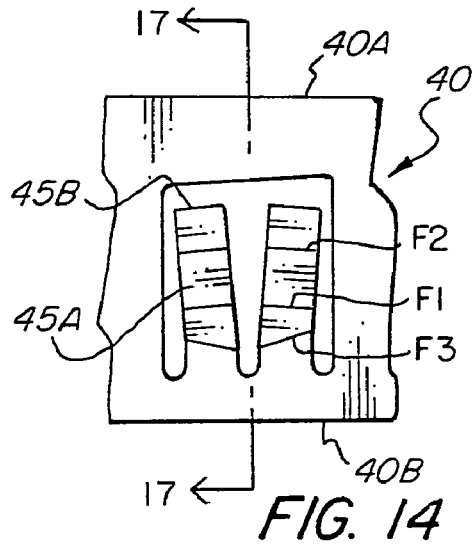
FIG. 14 is a fragmentary top view of a portion of the blank forming the inner retainer sleeve or ring.
Figure 15:
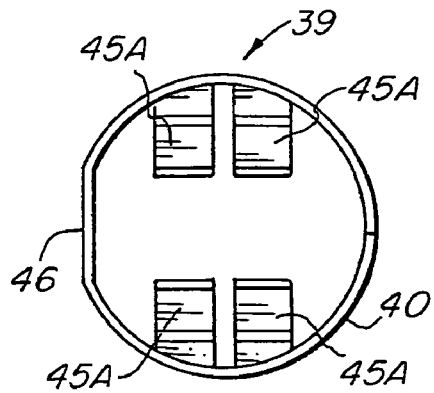
FIG. 15 is an end view of the inner wire conductor retainer ring or sleeve.
Figure 17:
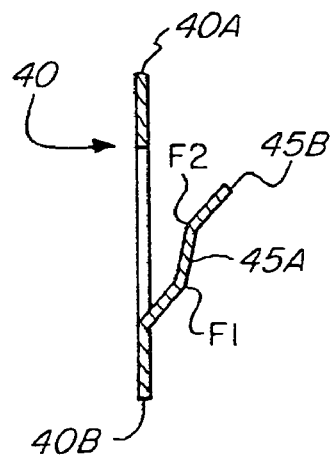
FIG. 17 is a section view taken along 17-17 on FIG. 16.
Figure 16:
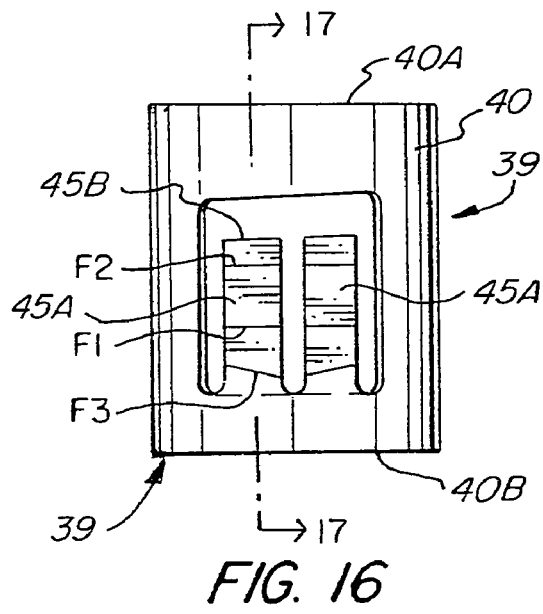
FIG. 16 is a top view of the inner retainer ring or sleeve of FIG. 15.
Figure 18:
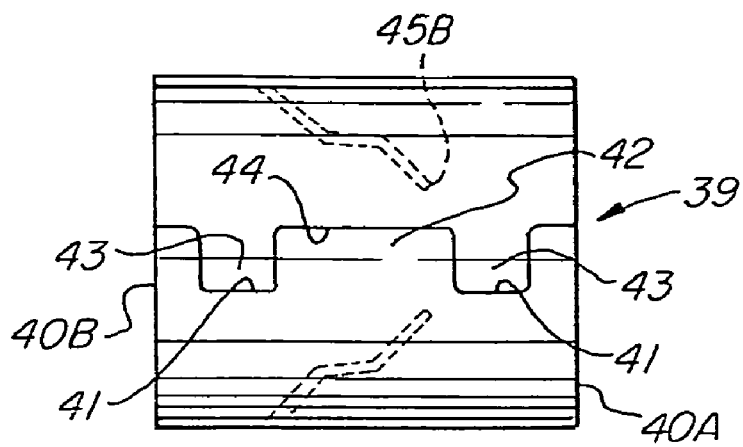
FIG. 18 is a side view of the inner retainer ring or sleeve.
Figure 19:
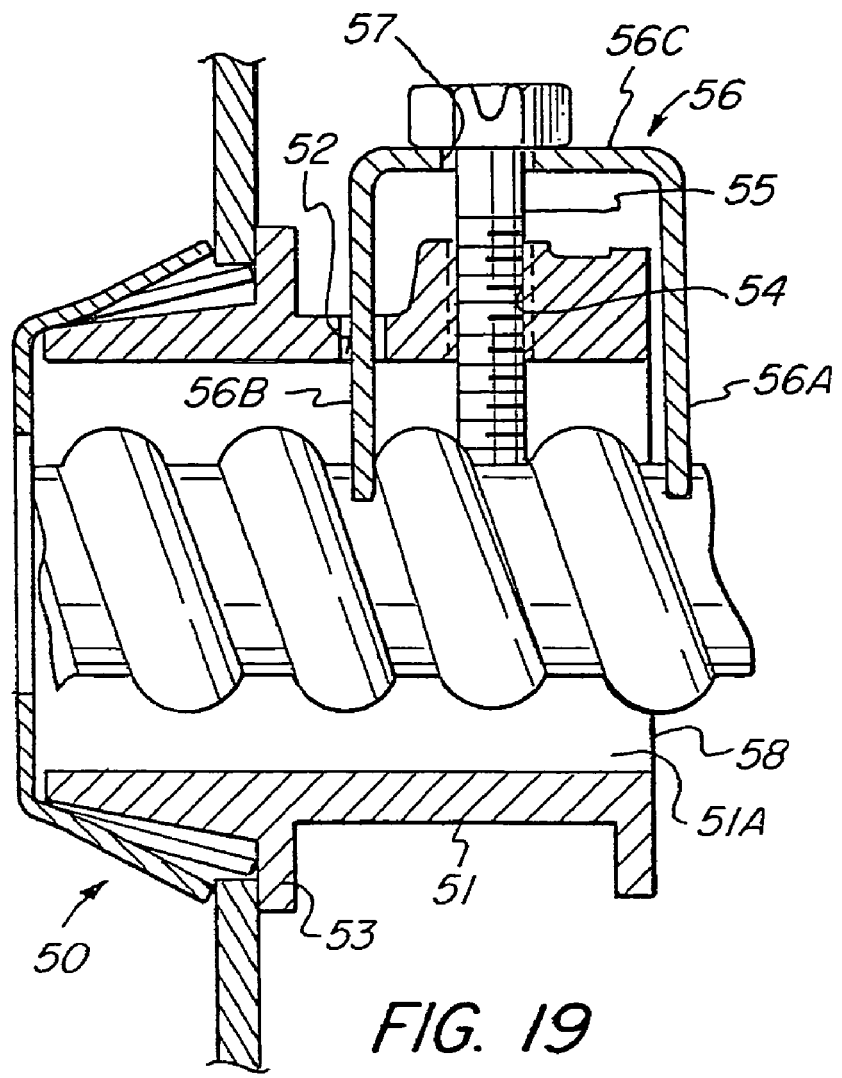
FIG. 19 is a sectional side view of still another embodiment.

As illustrated in FIG. 2, the opposed pair of arms AA are each provided with a retaining slot 21. The opposed pair of arms BB, as best seen in FIGS. 2 and 9, are blanked or formed to define a locking tang 22 and to either side thereof the trailing edge of the retaining ring defines an electrical grounding tang 23, 23. As shown, the locking tang 22 is slightly shorter than the adjacent grounding tangs 23, 23. The arrangement is such that the free end of the locking tangs 22 are sprung outwardly and formed so as to engage the inside surface of the electric box 15 in the assembled portion, as best seen in FIG. 9, to secure the connector assembly 10 to the electric box 15 and prohibit any unintentional withdrawal of the connector assembly 10 from the electrical box 15, whereas the free ends or trailing edges of the frustro-conical ring define the grounding tangs 23 that are biased in engagement with the internal periphery of the knockout hole 14. Also, the free edge or end 24A of arms A,A in the assembled position will also function as electrical grounding tangs, as noted in FIG. 8.

In forming the retaining ring 18 from blank 19, the respective arms A,A and B,B are subjected to a series of progressive bending dies which will gradually bend the respective arms about a foldline f, which defines the face or front portion 20, whereby arms A,A and B,B form a cup having circumscribing frustro-conical or outwardly flaring sides to define a frustro conical ring 18 which complements the conical surface S of the leading or outlet end portion 11B, as seen in FIG. 1. In doing so, the locking tangs 22 are cantileverly and outwardly bent or displaced relative to the surface of the frustro-conical ring at a slightly greater outwardly angle or slope than the adjacent grounding edge or tangs 23 and the slope of arms A,A. With the retaining ring 18 so formed, it can be readily fitted onto the outlet end portion 11B whereby the inherent resiliency of the arms A,A will cause the retainer slots 22 to snap fit onto the retaining lug 17 when slots 21 are placed in alignment with lugs 17. The arrangement is such that the retainer ring 18 will be firmly and positively secured to the outlet end portion 11B as seen in FIG. 8. Yet, due to the inherent resiliency of the material of the retaining ring 18, it can be easily detached from the outlet end portion 11B when removal is desired, without destroying the ring 18 by lifting arms A,A free of the retaining lugs 17.

It will be understood that, if desired, the opening 20A may be enlarged to the diameter of the foldline f, in which case the arms A,A and B,B may be gradually bent about the periphery of the enlarged opening, thereby eliminating the face portion 20.

With the retaining ring 18 properly secured to the outlet end 11B of the connector body 11, the connector assembly 10 can be readily secured to an electric box or panel 15 by simply aligning the assembly 10 with a knockout hole 14, as best seen in FIG. 7, and inserting the leading or outlet end portion into the knockout hole 14 until the flange 13 engages the outer side of the electric box or panel 15. In doing so, the tangs 22, 23 and the free ends 24 of arms A,A, respectively, will depress inwardly to permit insertion of the assembly 10. When the assembly is fully seated in the knockout hole 14, the locking tangs 22 will normally spring outwardly to secure the assembly 10 to the electric box 15, as noted in FIG. 9. The inherent resiliency of the grounding tangs 23, 23 and the free end or edge 24A of arms A,A are normally biased in engagement with the internal periphery of the knockout hole 14 to ensure a positive electrical ground with the electric box 15. The engagement of the free end 24A of arms A,A and grounding tangs 23, 23 against the inner periphery of the knockout hole 14, as noted in FIG. 8, further ensures the firm securing of the retaining slot 21 with the retaining lugs 17, so as to prohibit any disengagement of the outer retaining ring 18 from the connector body 11.

It will be understood that the wire conductor 25 may be secured to the connector assembly 10 either before or after the assembly 10 has been secured to the electric box 15. In the illustrated embodiment, the conductor wire 25 is simply inserted into the inlet end portion 11A and secured in position by a suitable securing means. In the illustrated embodiment of FIG. 1, the securing means is illustrated as a set screw 26. However, it will be understood that other forms of securing means, including some of the securing wire conductor retaining means disclosed herein, may be used in lieu of a screw.

From the foregoing, it will be apparent that the disclosed connector assembly is quite novel and simple in construction. The snap fit retaining ring 18 can be simply formed from a cruciform shaped blank 19 of spring metal whereby the opposed radially extending arms A,A and B,B can be readily formed into a cup having a generally frustro-conically shaped sidewalls complementing the slope of the outlet end portion 11A, and whereby the outer retainer ring 18 can be readily secured to the connector body simply by the inter-engagement of slots 21 with its complementary lugs 17.

In the assembled position, the outer retainer ring 18 is positively secured to the connector body in a manner to prohibit any unintentional separation. Also the tangs 22 and 23, which are formed integral with ring 18, are shaped and formed so that the locking tangs 22 secure the assembly 10 to an electric box 15 while the grounding tangs 23 ensure a positive electrical ground of the assembly 10 with the associated electric box 15.

FIGS. 11 to 19 illustrate various views of a modified form of the invention which are described in application Ser. No. 11/100,250 filed Apr. 6, 2005, now U.S. Pat. No. 7,064,272, for Snap In Electrical Connector Assembly With Unidirectional Wire Conductor Ring, which is incorporated by reference herein in its entirety.

Figure 20:
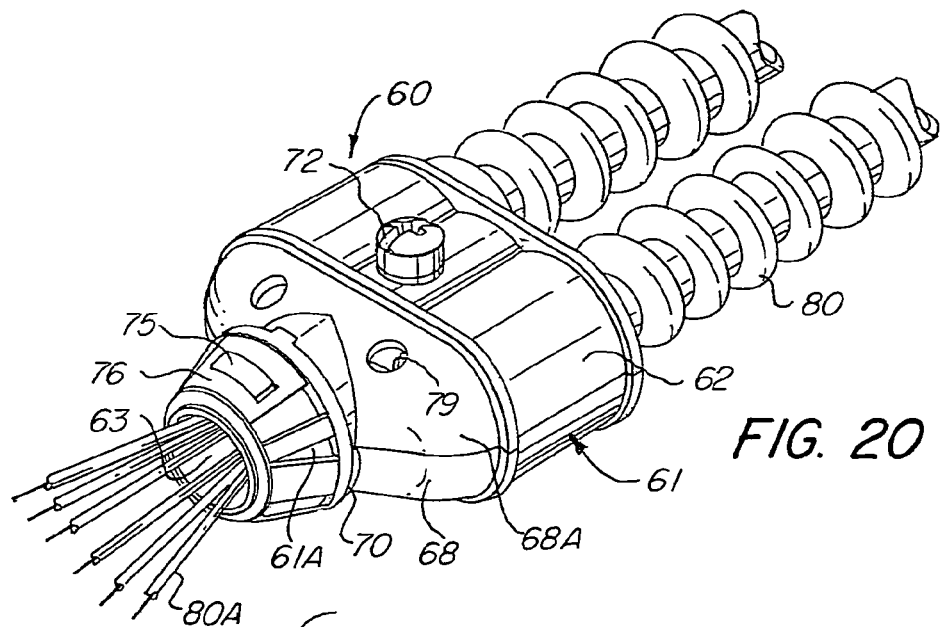
FIG. 20 is a perspective view of a further embodiment of the invention.
Figure 21:
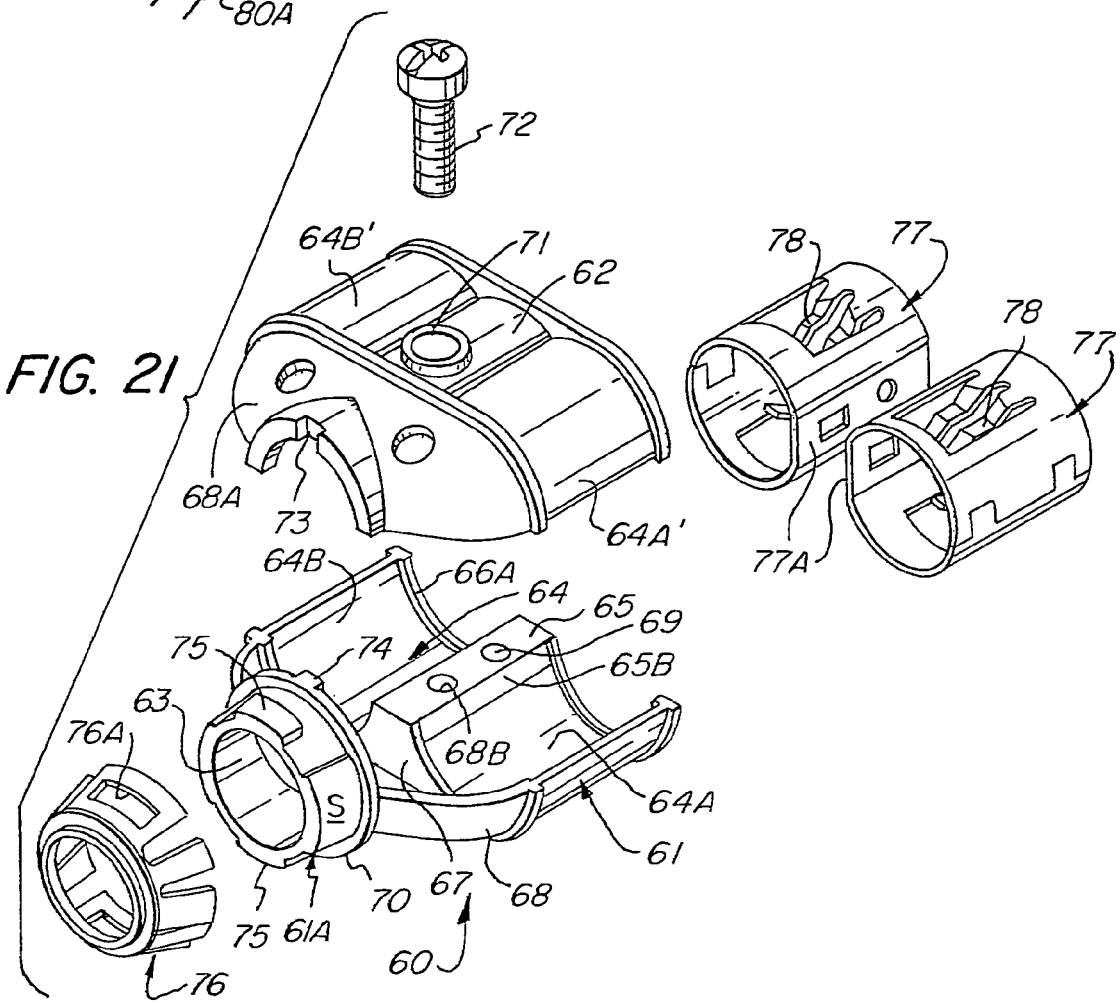
FIG. 21 is an exploded perspective view of the embodiment of FIG. 20.
Figure 22:
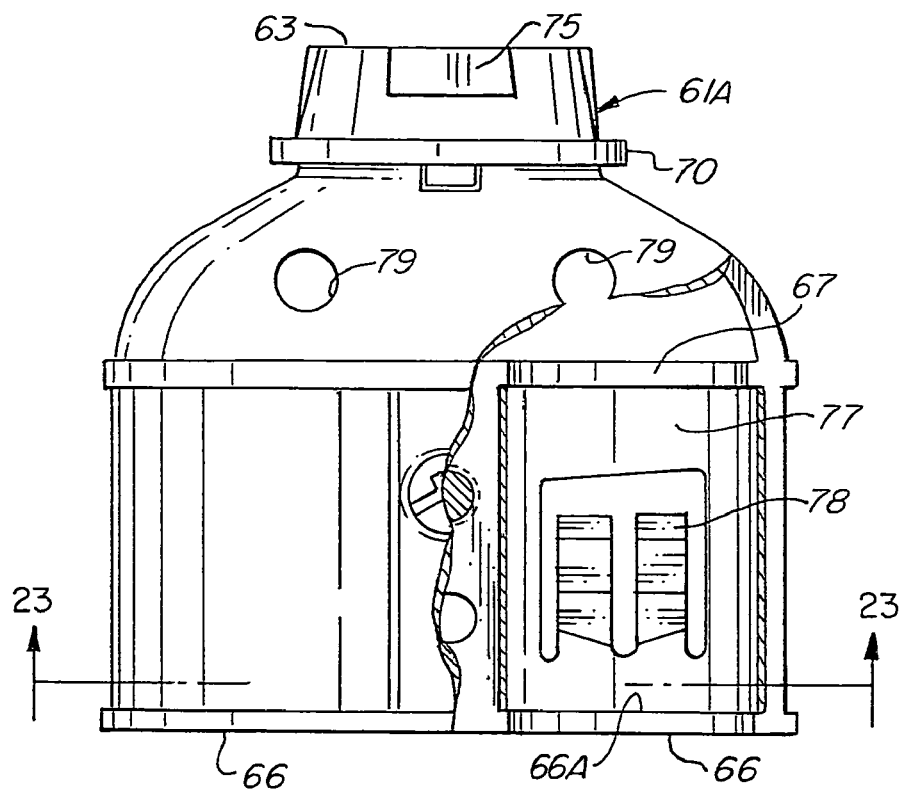
FIG. 22 is a top plan view of the embodiment of FIG. 20 having parts thereof broken away.
Figure 23:
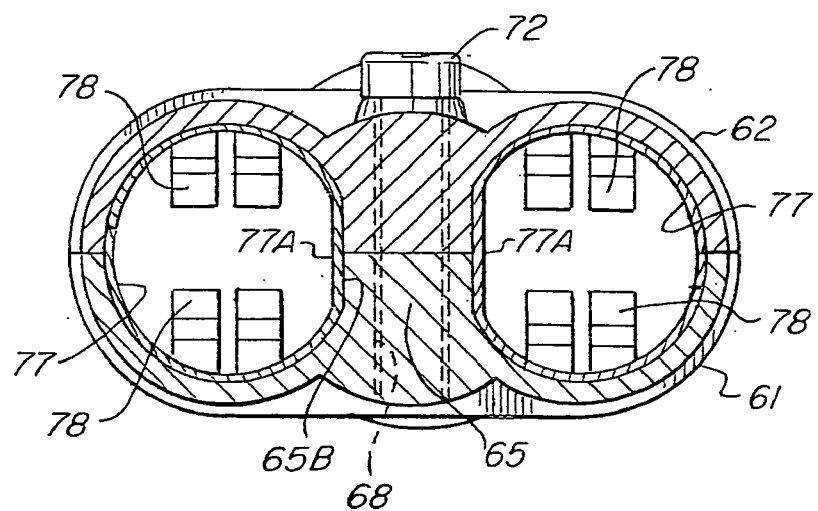
FIG. 23 is a sectional view taken along line 23-23 on FIG. 22.
Figure 28:
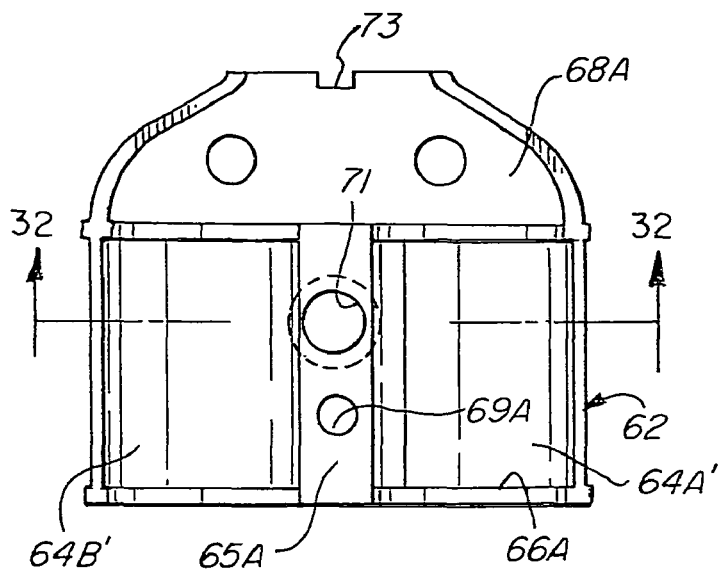
FIG. 28 is an inside plan view of the complementary housing section of the embodiment illustrated by FIG. 20.
Figure 29:
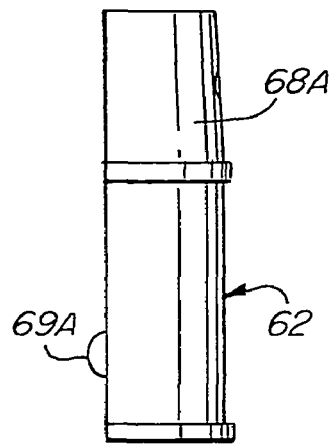
FIG. 29 is an end view of FIG. 28.
Figure 30:
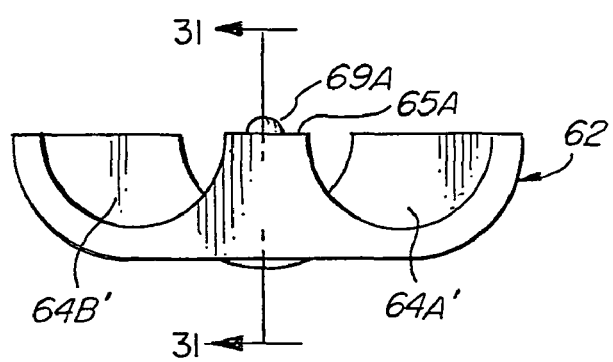
FIG. 30 is an inlet end view of FIG. 28.
Figure 31:
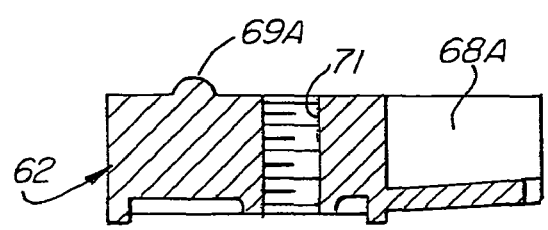
FIG. 31 is a sectional view taken on line 31-31 on FIG. 30.
Figure 32:
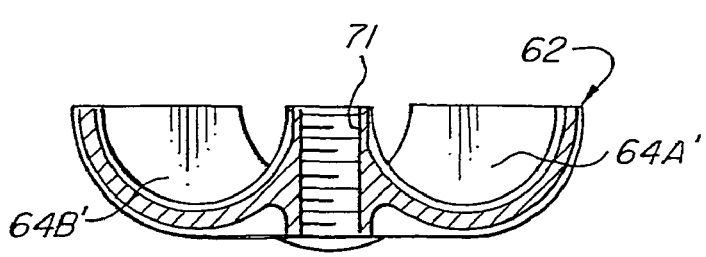
FIG. 32 is a sectional view taken on line 32-32 on FIG. 28.

FIGS. 20 to 32 are directed to a further modification of the disclosed invention. As best seen in FIGS. 20 and 21, the connector assembly 60 includes a housing or connector body 61 having an outlet end 61A and an inlet end 64 connected to the outlet end 61A by a transition section 68, 68A, preferably formed as casting of any suitable metal or alloy material, e.g. zinc, aluminum and the like. While the inlet end 64 of the connector body 61 is illustrated as a duplex inlet end, it will be understood that the inlet end may be formed to accommodate more than two separate wire conductors, cables or the like.

A more detailed description of the embodiments disclosed in FIGS. 20 to 32 is set forth in application Ser. No. 11/100, 250 filed Apr. 6, 2005 for Snap In Electrical Connector Assembly With Unidirectional Wire Conductor Retaining Ring, now U.S. Pat. No. 7,064,272, which is incorporated herein by reference in its entirety.

With the connector body of FIG. 20 illustrated, it will be noted that the connector assembly 60 can be readily secured to an electric box or panel simply by inserting the leading or outlet end 61A through a knockout hole of a panel or electrical box so as to be readily secured thereto with a snap fit as hereinbefore described. With the arrangement described, the respective wire conductors or cables 80 can be readily attached to the trailing or inlet end of the connector assembly 60 with a simple snap fit, as described in the said application Ser. No. 11/100,250 filed Apr. 6, 2005, now U.S. Pat. No. 7,064,272, which is incorporated by reference herein.

Figure 33:
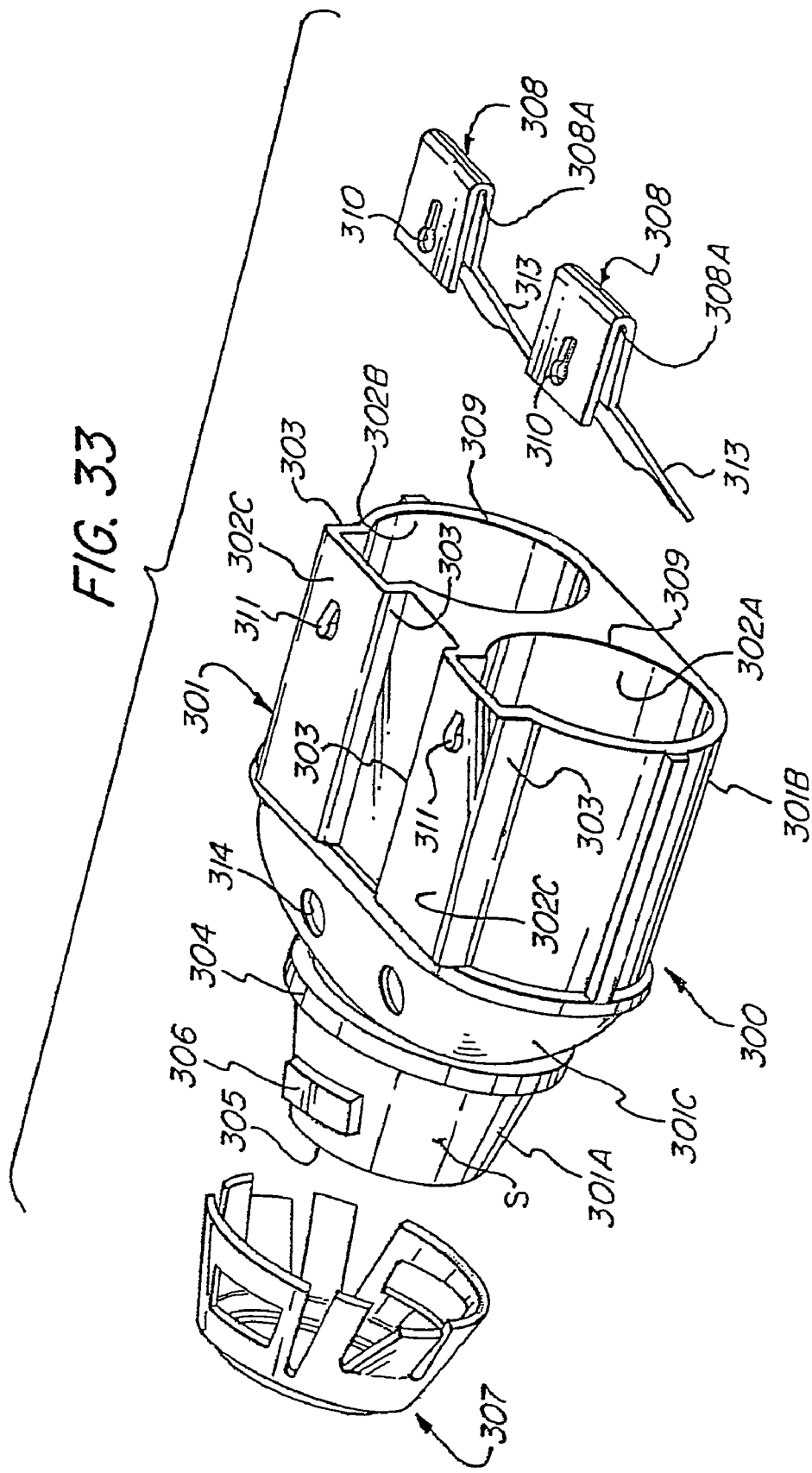
FIG. 33 is an exploded perspective view of still another modification of the invention.
Figure 34:
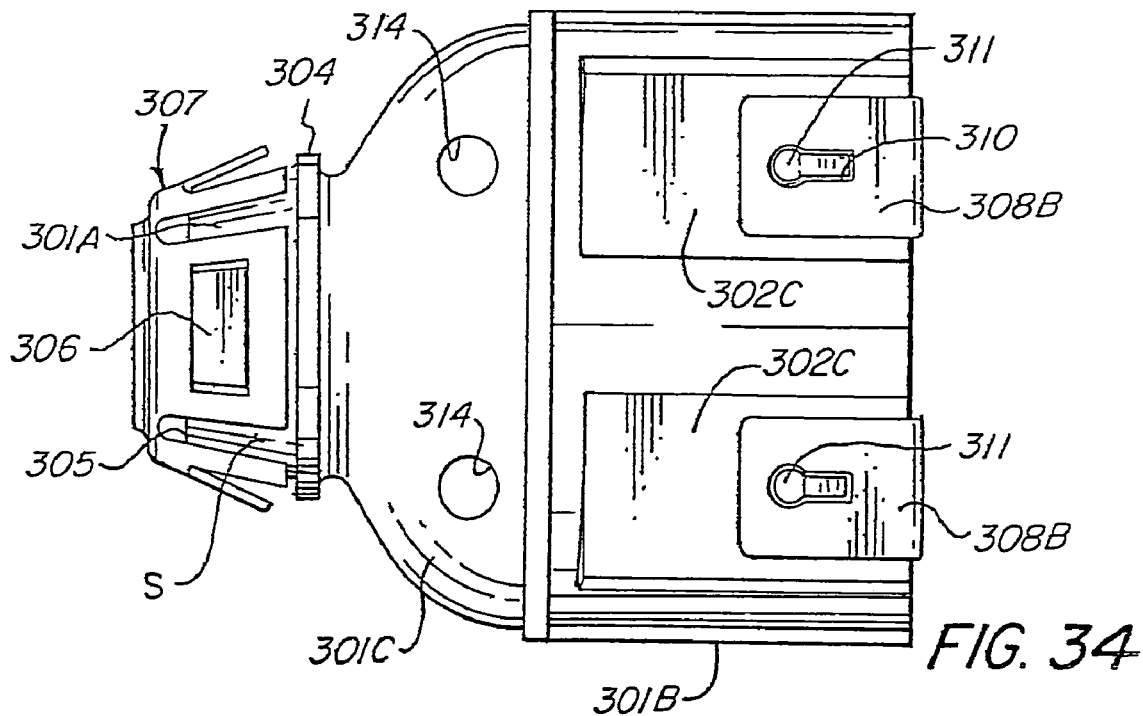
FIG. 34 is a top plan view of the embodiment of FIG. 33.
Figure 35:
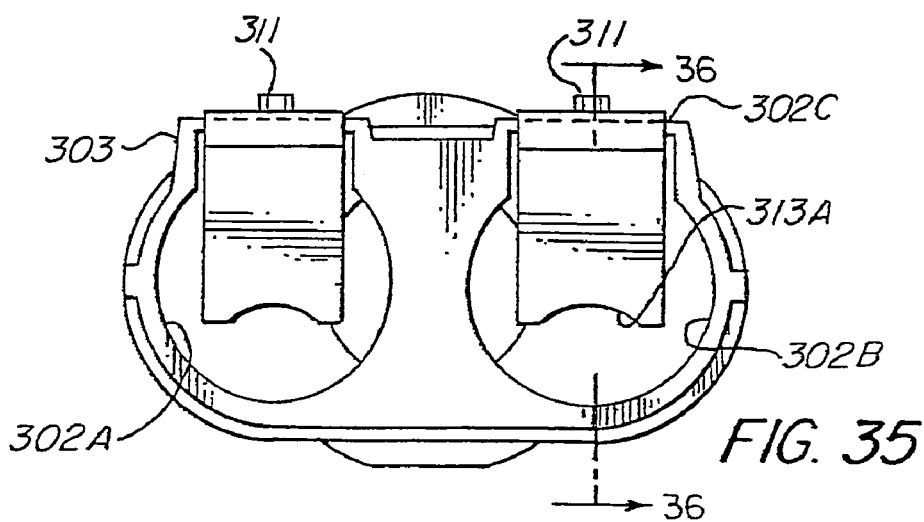
FIG. 35 is a right end view of FIG. 34.
Figure 36:
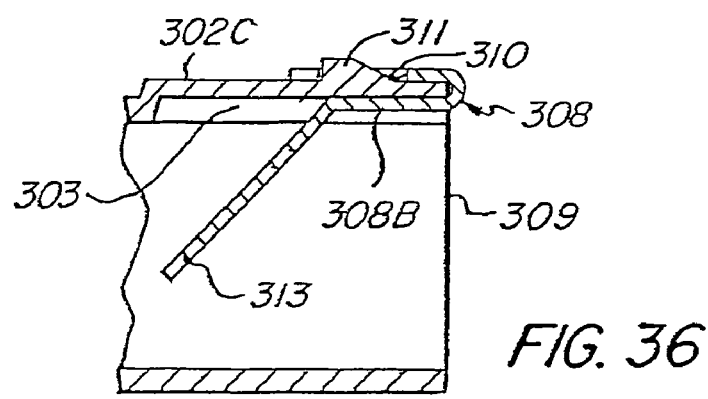
FIG. 36 is a sectional view taken along line 36-36 on FIG. 35.

FIGS. 33 to 36 illustrate a further embodiment of the invention. The connector assembly 300, as illustrated in FIGS. 33 and 36, includes a connector body 301 formed as a unitary casting of any suitable metal or alloy, e.g. zinc and the like. The embodiment of FIG. 33 differs from that of FIG. 20 in that connector body 301 is formed as a unitary casting rather than as separable parts as illustrated in FIG. 20. A more detailed description of the embodiment of the connector assembly of FIGS. 33 to 36 is set forth in application Ser. No. 11/403,099 filed Apr. 12, 2006, for Snap Fit Electrical Connector Assembly With Frustro-Conical Retainer Ring And Internal Unidirectional Snap Fit Wire Conductor Retainer, now U.S. Pat. No. 7,151,223, which is incorporated by reference herein in its entirety.

Figure 37:
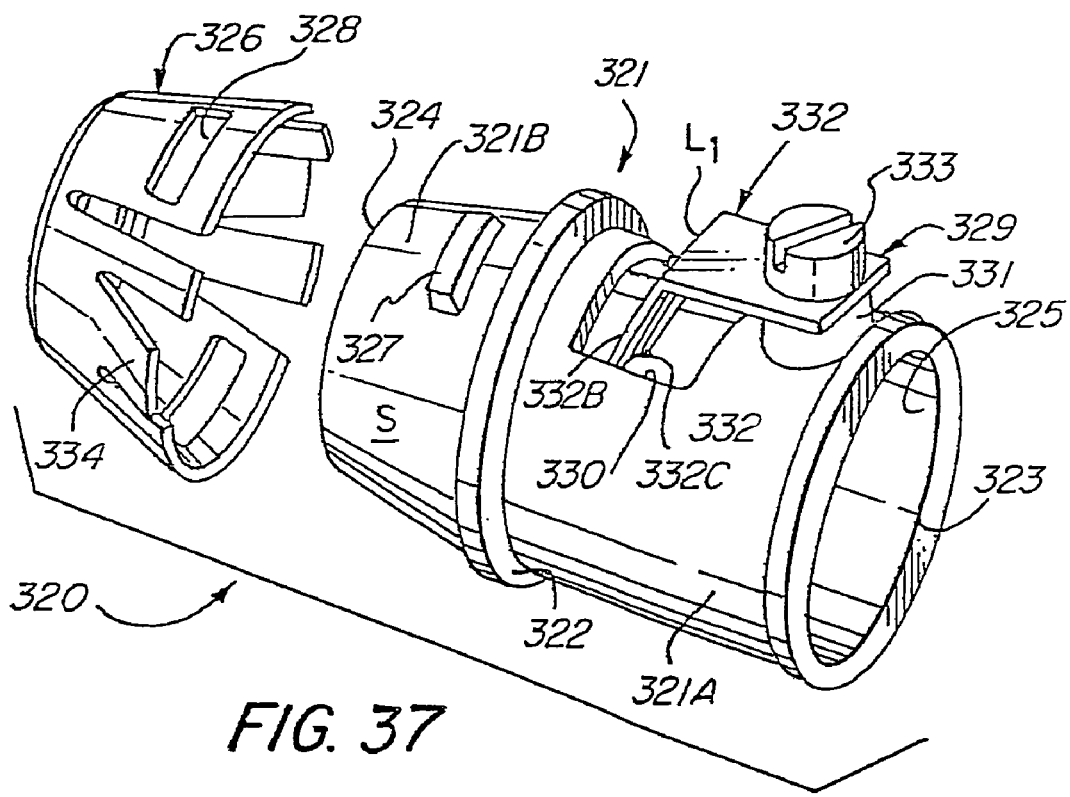
FIG. 37 is a perspective of a partially exploded view of another embodiment of the disclosed invention.
Figure 38:
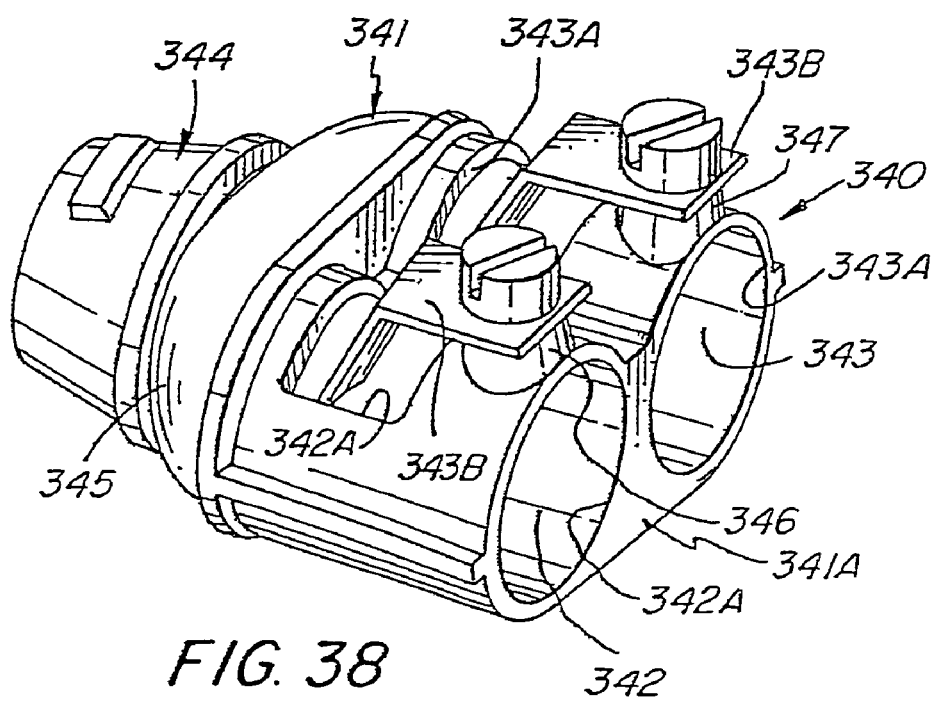
FIG. 38 is a perspective view of another modified form of the disclosed invention illustrated without the outer retainer ring.
Figure 39:
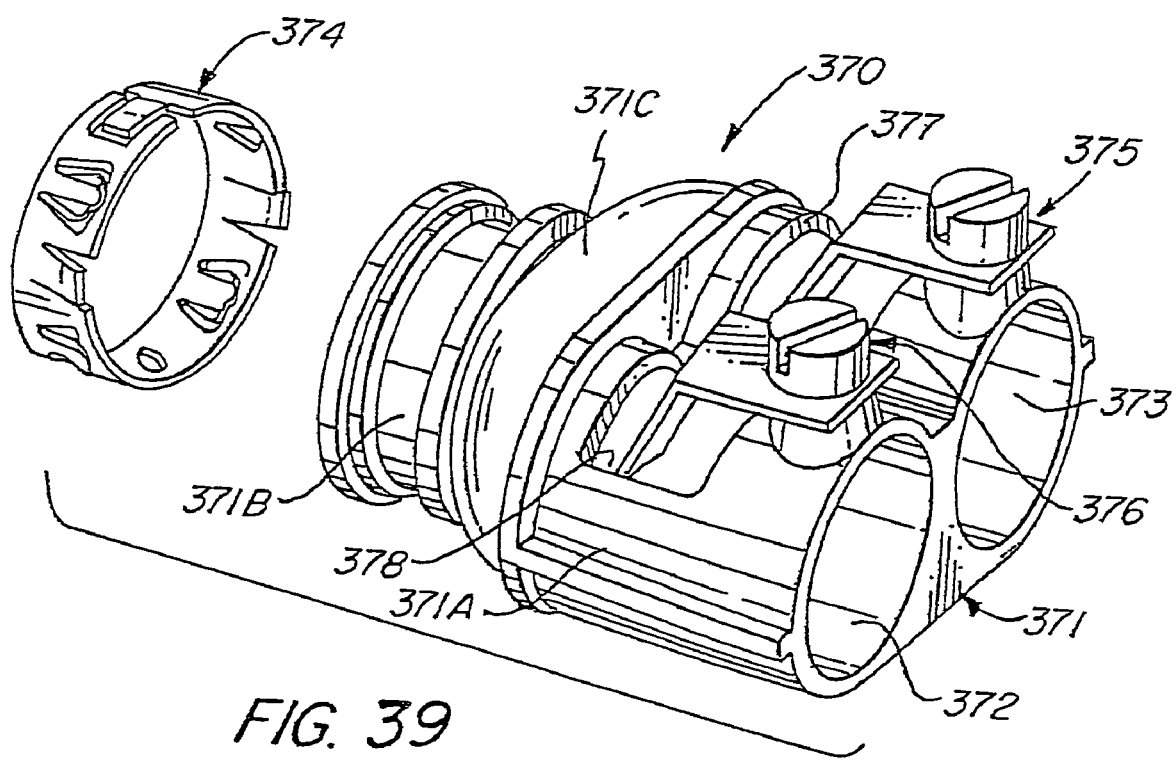
FIG. 39 is a perspective exploded view of a modified form of the invention.

FIGS. 37, 38 and 39 illustrate further modified embodiments of the invention which are disclosed in application Ser. No. 11/501,131 filed Aug. 8, 2006 for Electrical Connector With Outer Retainer Ring And Unidirectional Conductor Retainer, which is also incorporated by reference herein, and need not be repeated herein.

FIGS. 40 to 45 are directed to other modified embodiments of the invention. FIGS. 40 to 45 are directed to a strap-type electrical connector 500 for securing either nonmetallic cables or armor or metal clad cables thereto, as will be described herein.

As best seen in FIGS. 40-44, the illustrated strap type connector 500 includes a connector body 501 having an outlet end 502 terminating in an outlet opening 503. Opposite the outlet opening 503, the connector body 501 is provided with an inlet opening 504. Circumscribing the connector body between the outlet opening 503 and the inlet opening 504 is a radially outwardly extending flange 505 which serves as a stop to limit the distance the outlet end portion of the connector body 501 may be inserted through a knockout hole or opening 506 of an electric box or panel 507. The outer surface "S" of the outlet end 502 slopes or converges inwardly toward the outlet opening 503.

Circumferentially spaced about the outlet end 502 of the connector body 501 are one or more radially outwardly projecting retaining lugs 508. In the illustrated embodiment, two such retaining lugs 508 are provided 1800 apart.

Secured to the outlet end 502 of the connector body and circumscribing the outlet end 502 is a frustro-conical snap fit retainer or retainer ring 509, similar to the frustro-conical retainer ring hereinbefore described with respect to FIGS. 1 to 5 herein. As best seen in FIG. 40, the frustro-conical, snap-fit, retainer 509 includes a front opening 510 circumscribed by rearwardly and outwardly sloping or bent locking tangs 511. Grounding tangs 513 are provided with retaining slots 514 arranged to receive the retaining lugs 508 when fitted onto the outlet end 502 of the connector body 501, as hereinbefore described.

Connected to the connector body 501 adjacent the inlet opening and forming an integral part of the connector body 501 is a cable support saddle 515 which extends about a circumferential portion of the inlet opening 504, e.g. between approximately 120° to 180° about the inlet opening 504. As shown, the cable support saddle 515 is a curvilinear extension of the inlet opening 504 terminating in laterally outwardly extending ears or lobes 515A and 515B. As best seen in FIG. 40, ear or lobe 515A has a hinge slot 516 formed therein and ear or lobe 515B is provided with an internally threaded hole 517.

Hingedly connected to ear or lobe 515A is a clamping strap 518. As best seen in FIG. 40, the clamping strap 518 is provided with a readily detachable hinge structure 519 which is angularly formed relative to the plane of the strap 518 so as to be received in the hinge slot 517 when connected to the saddle 515. According to this invention, the hinge structure 519 terminates laterally outwardly extending foot portion 520.

In accordance with this invention, the foot portion 520 of the hinge structure 519 is provided with a width "W" which is slightly greater than the width "w" of the hinge slot 516. The arrangement is such that the clamping strap 518 must be skewed or angled relative to the hinge slot 516 for inserting the foot portion 520 through the hinge slot 516 for connecting the clamping strap 518 to the ear or lobe 515A. When so connected, the clamping strap 518 is free to pivot relative to the saddle 515 between a cable clamping and unclamping position without causing the clamping strap 518 to become detached from the saddle 515. To effect detachment of the clamping strap 518 from the ear or lobe 515A, one must intentionally skew or angle the clamping strap 518 relative to the hinge slot 516 to effect the removal of the clamping strap 518 from the saddle.

The other end of the clamping strap 518 is provided with a strap hole 521 for receiving a fastener, e.g. a screw 522 for securing the clamping strap 518 to the ear or lobe 515B so that the cable is firmly clamped and secured between the saddle 515 and the clamping strap 518.

To insure a positive gripping of the cable between the saddle 515 and the clamping strap 518, an intermediate portion of the clamping strap is provided with a depression 523 that will "bite" or exert a positive frictional force on the cable, when secured in the clamping position (FIG. 86) so as to prohibit the cable of being pulled free or become accidentally detached from the connector body.

As shown, the connector body 501 and connected saddle 515 is preferably formed as a metal casting, e.g. zinc or other suitable metallic alloy. The strap electric connector as illustrated in FIGS. 40 to 44 is preferably used for securing either a non-metallic cable or romex type conductor to an electric box or panel.

By slightly modifying the shape of the clamping strap, the described strap type electric connector may be readily adapted for connecting an armored, or metal clad cable, to an electric box or panel.

Figure 45:
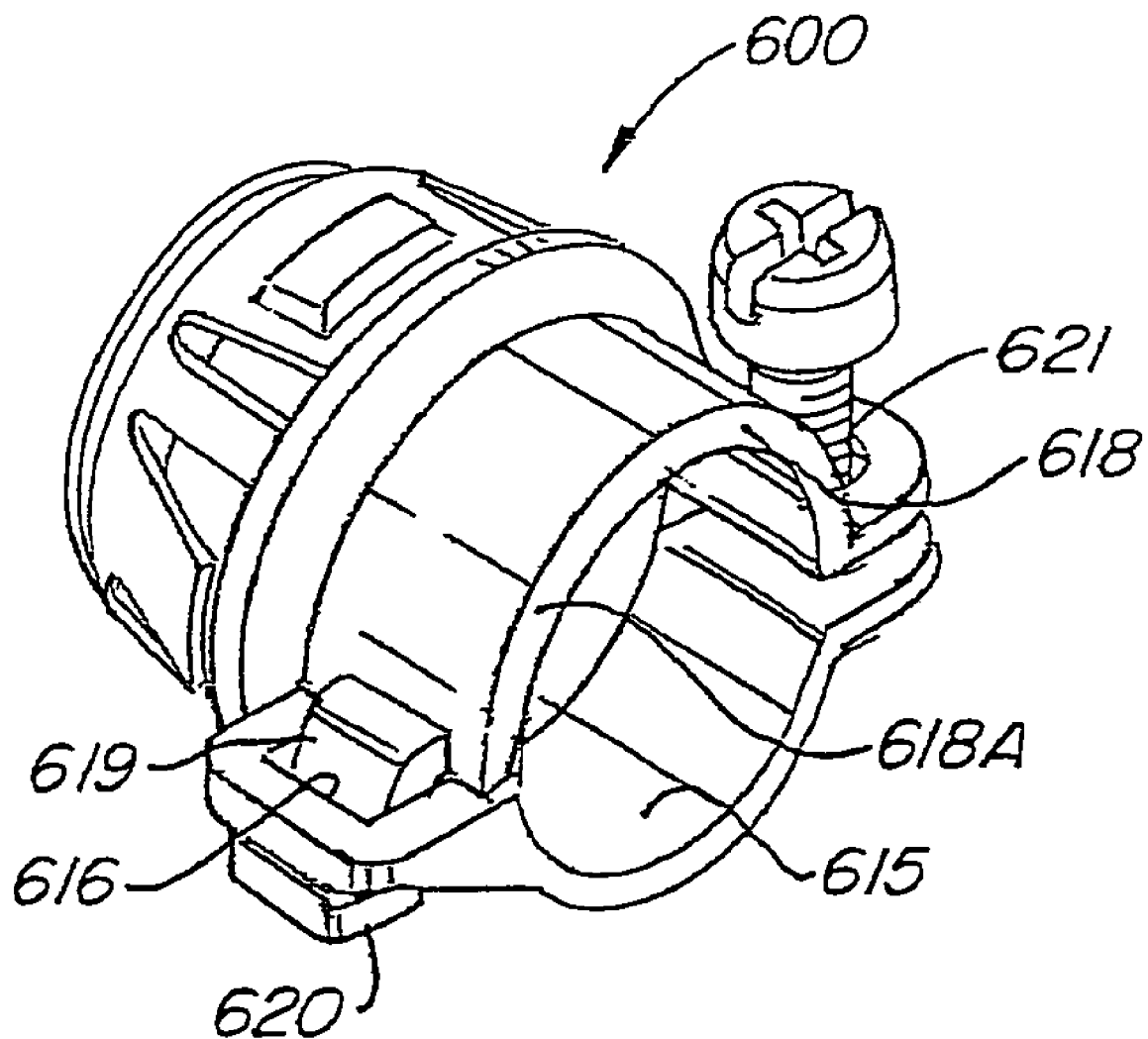
FIG. 45 is a perspective view of a modified strap type electrical connector.
Figure 49:
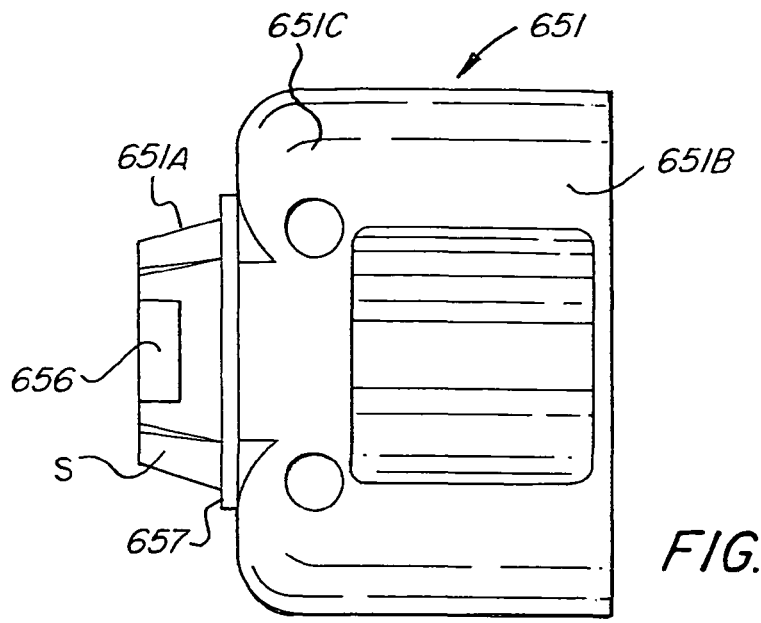
FIG. 49 is a top plan view of a duplex connector body of FIG. 46.
Figure 50:
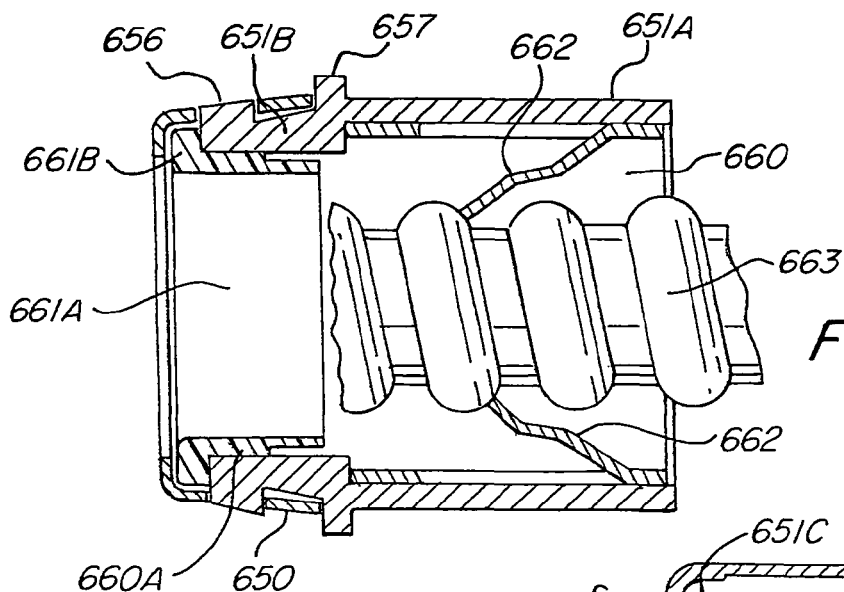
FIG. 50 is a sectional side view of the electrical duplex connector assembly of FIG. 46 in the assembled position of the component parts.
Figure 51:
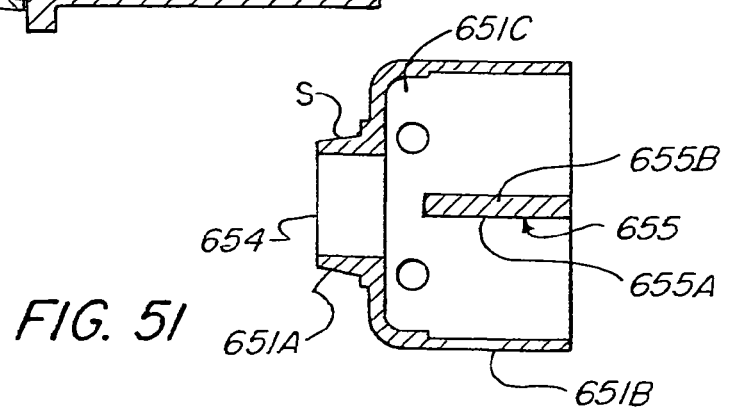
FIG. 51 is a sectional view on a reduced scale of the connector body taken along section line 51-51 on FIG. 46.

FIG. 45 illustrates a modified strap type electrical connector assembly 600 for use in securing an armor or metal clad cable. As shown in FIG. 45, the strap type electrical connector assembly 600 is provided with clamping strap 618 having an intermediate curvilinear portion 618A shaped to compliment the roundness of a metal clad cable, e.g. a BX cable. One end of the armored cable strap is provided with a hinge structure 619, 620 similar to the hinge structure 519, 520 hereinbefore described, whereby the armored cable strap can be hingedly connected to the hinge slot 616 of the associated saddle 615. The other end of the armored cable strap 618 is provided with a hole or opening 621 for receiving a fastening screw similar to that described with respect to FIG. 84. In all other respects, the function and structure of the strap connector 600 is similar to that described with respect to FIGS. 84 to 88, and need not be repeated.

From the foregoing description, it will be noted that the armored cable strap 618 can be readily interchanged for the non-metallic cable strap 518 depending upon the type of cable to be secured by the described connector body.

It will be apparent that the principle components described herein, viz. the external frustro-conical retainer rings, the connector bodies and the differently described wire conductor retainers, are rendered readily interchangeable with respect to any of the complementary corresponding components of the various embodiments described herein.

It is to be further noted that the frustro-conical retainer ring, as described herein with respect to the various embodiments disclosed, achieves the further advantage of ensuring positive electrical grounding of the described connector assemblies to an electrical box or panel despite the varying allowable diameter tolerances a knockout hole may have, as permitted by the allowable codes or electrical standards, due to the inherent resiliency and shape that a frustro-conical configuration allows, as described herein.

Referring to FIGS. 47 to 51, there is disclosed a further improvement of the invention describe herein. FIG. 46 illustrates an exploded view of a duplex type connector assembly 650 that includes a connector body 651 having a single outlet end portion 651A and a duplex inlet end portion 651B. As shown, the inlet end portion 651B includes a pair of parallel passageways or bores 652, 653 that are in communication with the outlet end portion 651A. Between the inlet end portion 651 and the outlet end portion 651A is a transition section 651C, which diverges toward the outlet end opening 354. The respective passageways or bore are separated by a partition wall 655 having opposed vertical surfaces 655A, 655B, as viewed in FIGS. 46-48.

For a more detailed description of the embodiments disclosed in FIGS. 46-51, reference is made to a copending patent application Ser. No. 12/006,946 filed Jan. 8, 2008 for Electrical Duplex Connector Having an Integrally Formed Connector Body with a Frustro-Conical Retaining Ring and Unidirectional Cable Retainers, which is incorporated by reference in its entirety herein.

The simplicity of a duplex connection having a unitary connector body construction provided with an outer frustro-conical retainer for securing the same with a snap fit locking arrangement to an electric box or panel, and the ease by which a wire conductor can be secured to a connector body utilizing the described internal cable retainers enhances the ease of manufacture and assembly of such connectors to result in substantial savings of labor and costs for producing the same, while enhancing the ease of use of such connectors in the field which further aids to minimize the time, effort and labor required to install the same.

Figure 52:
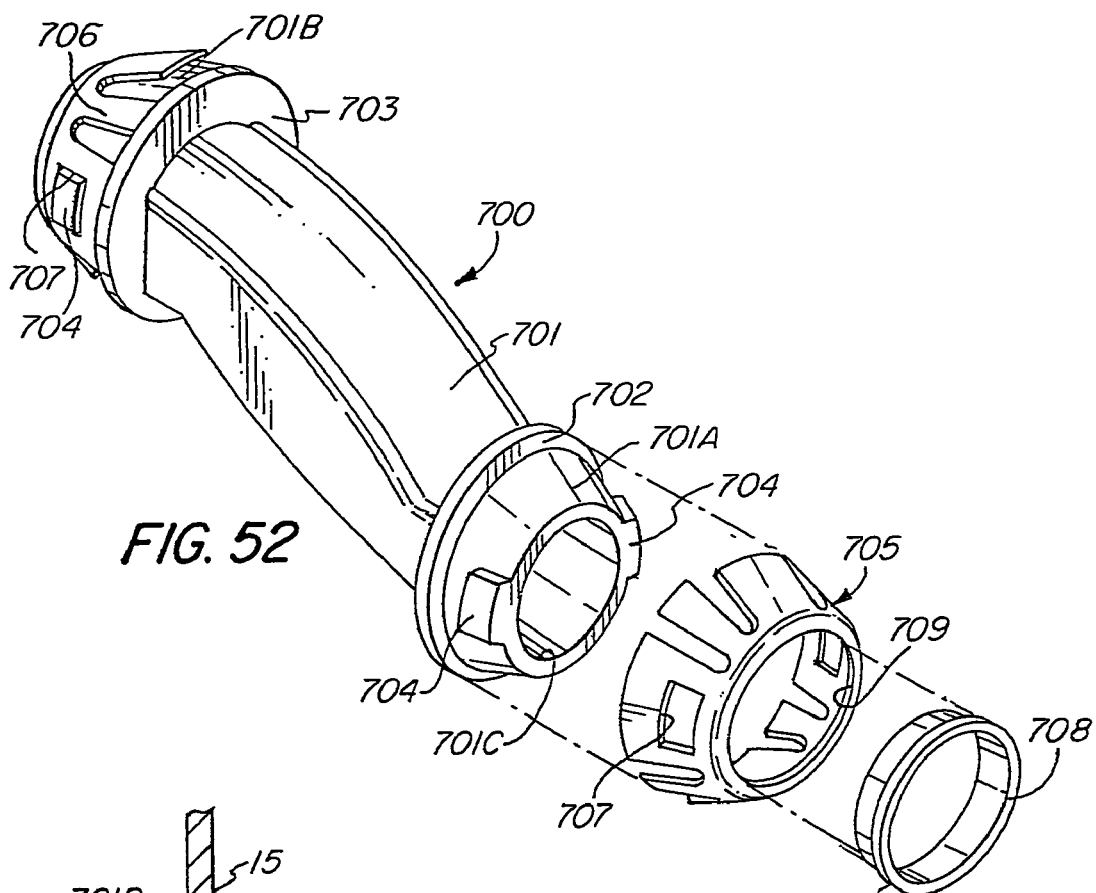
FIG. 52 is an exploded perspective view of an offset nipple assembly embodying the invention.
Figure 53:
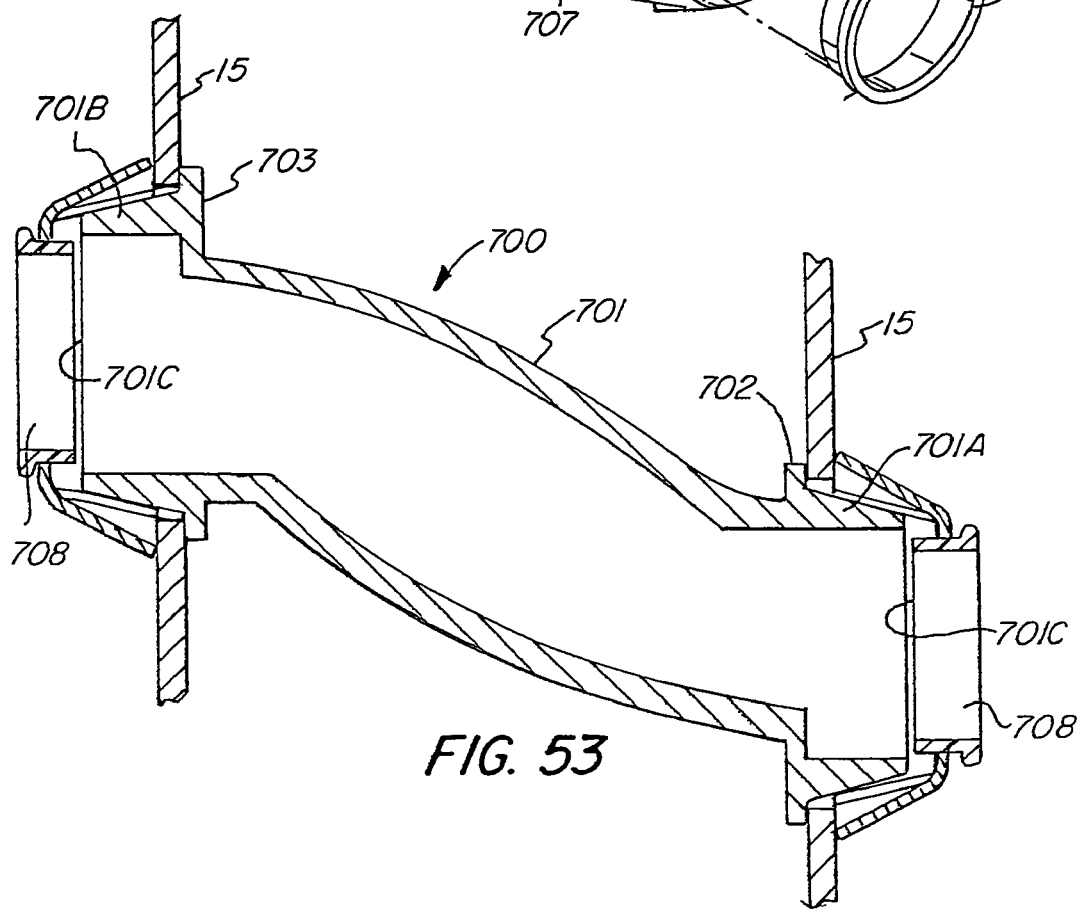
FIG. 53 is a side section view of the offset nipple assembly of FIG. 52 interconnected between a pair of electric boxes or panels at different elevations.

FIGS. 52 and 53 illustrate another embodiment of the invention disclosed herein. This embodiment is directed to an electrical offset nipple connector assembly 700 adapted to attach to a knock out hole of two adjacent electric boxes or panels 15 for directing a conductor wire or cable therethrough wherein the respective knock out holes may or may not be in alignment. More often than not the knock out holes of adjacent boxes or panels 15 to be interconnected are not in alignment. In such instances the electric nipple assembly 700 comprises a nipple connector body 701 in the form of an elongated tubular conduit having opposed end portions 701A, 701B that are angularly offset as shown in FIGS. 52 and 53. Preferably the nipple body 701 is formed as a metal casting out of zinc, steel or other suitable metal or metallic alloy. While the illustrated embodiment of the nipple connector body 700 is formed with offset end portions 701A, 701B, it will be understood that the nipple connector body may also comprise of a straight elongated tubular member having opposed end openings, the centers of which are coincident with the longitudinal axis of such straight tubular member (not shown herein). Such straight nipple connector bodies are adapted for connecting the knock out openings of two adjacent electric boxes or panels that are at the same level, i.e. in alignment.

In accordance with this invention, the nipple connector body is provided with a radially outwardly extending flange 702, 703 spaced inwardly from each of the adjacent end portions 701A, 701B respectively. The respective flanges 702, 703 function as a stop to limit the distance the opposed ends 701A, 701B of the nipple body 701 may be inserted into a knock out hole of an electric box or panel 15 to be connected thereto. The outer surfaces of the respective end portions 701A, 701B of the tubular body 701, extending between the flange 702, 703 and the adjacent end openings 701C, 701C, slope or taper downwardly from the flange 702,703 and toward the end openings 701C, 701C defined thereby. Thus the sloping surface adjacent the respective end openings 701C, 701C have a frustro-conical configuration as herebefore described. Formed on the outer surface of the respective end portions 701A, 701B are one or more radially outwardly extending retaining lugs 704. Two such retaining lugs 704 are oppositely formed about each of the respective end portions 701A 701B and adjacent their respective end openings 701C.

Secured about each of the respective end portions 701A, 701B is a frustro-conical retainer 705, 706. The respective frustro-conical retainers 705, 706 embody the structure as herebefore described with respect to FIGS. 2 to 6, and need not be repeated herein.

In operations it will be noted that the frustro-conical retainer 705, 706 may be readily snap fitted onto the opposed tapering outer surface circumscribing the respective opposed end portions 70A, 701B, whereby the opposed retaining slots 707 formed on each of the respective frustro-conical retainers 705 706 engage with the retaining lugs 704 to secure the respective frustro-conical retainer 705, 706 on the corresponding end portions 701A, 701B of the nipple connector body 701.

With the construction described, the offset nipple assembly 700 can be readily snap fitted to a knock out hole of an electric box or panel as hereinbefore described.

In certain installations it may be desirable to provide a frustro-conical snap fit retainer 705 or 706 on only one end portion of the nipple body 701. The other end e.g. end portion 701B may be provided with external threads (not shown) where such threaded end may be secured to an adjacent electric box or panel by means of a lock nut. With such construction, one end of the nipple body can be readily snap fitted to a knock out opening of an electric box or panel, while the other threaded end portion may be secured to a knockout hole of an adjacent electric box or panel by a lock nut.

If desired, a plastic bushing 708 may be press-fitted to the face opening 709 of the frustro-conical retainer 705, 706 as noted in FIG. 53. The bushing 708 protects any insulated wire or cable which is arranged to be pushed or fed through the nipple connector body 701 (not shown).

While the present invention has been described with respect to several embodiments, it will be understood that various modifications may be made without departing from the spirit or scope of the invention.

What is claimed is:

1. An electrical connector assembly comprising:
a connector body having opposed end portions defining opposed end openings, at least one of the opposed end portions having a sloping surface,
a frustro-conical retainer circumscribing the at least one of the opposed end portions having a sloping surface, said frustro-conical retainer comprising a leading end, a trailing end and a sloping intermediate surface therebetween, the trailing end having a diameter greater than the diameter of the leading end, and
means, formed at the location of the intermediate surface, for securing said frustro-conical retainer onto the at least one of the opposed end portions having a sloping surface.

2. An electrical connector assembly as defined in claim 1 wherein said end openings are angularly offset relative to one another.

3. An electrical connector assembly comprising:
a connector body having opposed end portions defining opposed end openings,
a frustro-conical retainer circumscribing at least one of the opposed end portions, said frustro-conical retainer comprising a leading end, a trailing end and an intermediate surface therebetween, the trailing end having a diameter greater than the diameter of the leading end,
means for securing said frustro-conical retainer onto the at least one of the opposed end portions,
a radially outwardly extending flange circumscribing each of said opposed end portions,
said flange being spaced inwardly from the end opening adjacent thereto.

4. An electrical connector assembly comprising:
a connector body having opposed end portions defining opposed end openings, at least one of the opposed end portions having a sloping surface,
a frustro-conical retainer circumscribing the at least one of the opposed end portions having a sloping surface,
means, formed at the location of the intermediate surface, for securing said frustro-conical retainer onto the at least one of the opposed end portions having a sloping surface,
wherein the opposed end openings are angularly offset relative to one another,
wherein said frustro-conical retainer includes a leading end, a trailing end and a sloping intermediate surface therebetween,
said trailing end having a diameter which is greater than the diameter of said leading end, and
said leading end having a central opening disposed in alignment with one of the opposed end openings.

5. An electrical connector assembly as defined in claim 4 and including:
a radially outwardly extending stop flange circumscribing said connector body adjacent said one end portion, and
said frustro-conical retainer including locking tangs circumferentially spaced about the outer surface of said frustro-conical retainer,
said locking tangs being blanked and cantileverely bent out of said intermediate surface of said retainer whereby the free ends of said locking tangs are angularly inclined toward said stop flange.

6. An electric offset nipple connector assembly comprising:
an elongated tubular nipple body having opposed end portions,
each of said end portions defining an end opening,
said end openings being off set relative to each other,
a radially outwardly extending flange circumscribing each of said end portions,
each of said flanges being inwardly spaced from said end opening adjacent thereto,
said opposed end portions having a circumscribing outer surface extending from said flange toward the adjacent end opening,
said outer surface sloping inwardly from said flange toward said end opening adjacent said flange, and a circumscribing fructo-conical retainer circumscribing at least one of said end portions,
said fructo-conical retainer having a leading edge, a trailing edge, and a sloping intermediate surface therebetween,
said trailing edge having a diameter which is greater than the diameter of said leading edge,
a plurality of locking tangs circumferentially spaced about the periphery of said fructo-conical retainer,
each of said locking tangs being formed out of the surface of said intermediate surface,
said locking tangs being cantileverably bent outwardly of said intermediate surface, and angularly inclined relative to said intermediate surface, and
means for securing said fructo-conical retainer about said end portion of said tubular nipple body.

7. An electric offset nipple connector assembly as defined in claim 6 wherein:
   said securing means includes a radially outwardly extending lug formed on each of said opposed end portions,
   and said fructro-conical retainer having a slot adjacent to receive said lug for securing said fructro-conical retainer on said end portion.

8. An electric offset nipple connector assembly as defined in claim 7, including:
   said trailing edge of said fructro-conical retainer being arranged to engage the periphery of a knock out hole of an electric box for effecting an electrical ground between an electric box and said offset nipple connector in the assembled position thereof.

9. An electric offset nipple connector assembly as defined in claim 8 and including a bushing connected to said end opening.

10. An electrical connector assembly comprising:
    a connector body having opposed end portions defining opposed end openings,
    a frustro-conical retainer circumscribing at least one of the opposed end portions, said frustro-conical retainer comprising a leading end, a trailing end and an intermediate surface therebetween, the trailing end having a diameter greater than the diameter of the leading end,
    means for securing said frustro-conical retainer onto the at least one of the opposed end portions,
    wherein said means for securing comprises retaining lugs and retaining slots.

11. An electrical connector assembly as defined in claim 10 wherein:
    the retaining lugs are formed on the opposing end portions of said connector body; and
    the retaining slots are formed in the intermediate surface of said frustro-conical retainer.

12. An electrical connector assembly as defined in claim 10 wherein:
    the opposed end openings are angularly offset relative to one another.

* * * * *